(12) United States Patent
Heckmeier et al.

(10) Patent No.: US 6,805,923 B2
(45) Date of Patent: Oct. 19, 2004

(54) LIQUID-CRYSTALLINE MEDIUM

(75) Inventors: Michael Heckmeier, Darmstadt (DE); Brigitte Schuler, Haibach (DE); Peer Kirsch, Darmstadt (DE); Eike Poetsch, Muehltal (DE)

(73) Assignee: Merck Patentgesellschaft Mit, Darmstadt (DE)

( * ) Notice: Subject to any disclaimer, the term of this patent is extended or adjusted under 35 U.S.C. 154(b) by 0 days.

(21) Appl. No.: 10/400,489

(22) Filed: Mar. 28, 2003

(65) Prior Publication Data

US 2003/0207047 A1 Nov. 6, 2003

Related U.S. Application Data

(62) Division of application No. 09/814,931, filed on Mar. 23, 2001, now Pat. No. 6,592,951.

(30) Foreign Application Priority Data

Mar. 23, 2000 (DE) .......................................... 100 14 293

(51) Int. Cl.[7] ........................ C09K 19/34; C09K 19/30; C09K 19/12; C09K 19/20

(52) U.S. Cl. .............. 428/1.1; 252/299.61; 252/299.62; 252/299.63; 252/299.66; 252/299.67

(58) Field of Search ...................... 428/1.1; 252/299.61, 252/299.62, 299.63, 299.66, 299.67

(56) References Cited

U.S. PATENT DOCUMENTS

| 5,238,599 | A | 8/1993 | Obikawa et al. |
| 6,399,163 | B1 | 6/2002 | Tomi et al. |
| 6,592,951 | B2 * | 7/2003 | Heckmeier et al. .......... 428/1.1 |

FOREIGN PATENT DOCUMENTS

EP  0 442 932 B1  8/1991

* cited by examiner

*Primary Examiner*—Shean C. Wu
(74) *Attorney, Agent, or Firm*—Millen, White, Zelano & Branigan, P.C.

(57) ABSTRACT

A liquid-crystalline medium based on a mixture of polar compounds having positive dielectric anisotropy, characterized in that it comprises one or more compounds of the general formula I

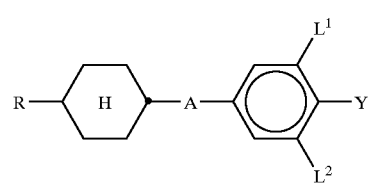

in which R, A, $L^1$, $L^2$ and Y are as defined herein are suitable for use in liquid crystal displays such as MLC, TN or STN displays.

35 Claims, No Drawings

LIQUID-CRYSTALLINE MEDIUM

The present invention relates to a liquid-crystalline medium, to the use thereof for electro-optical purposes and to displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give short response times, low threshold voltages and high contrast in the cells.

They should furthermore have a suitable mesophase, for example a nematic or cholesteric mesophase for the above-mentioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high resistivity, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). This is then referred to as an "active matrix", and a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material limits the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high resistivity values it is furthermore important that the resistivity increases as little as possible with increasing temperature and after heating and/or UV exposure. The low-temperature properties of the mixtures of the prior art are also particularly disadvantageous. It is required that crystallization and/or smectic phases do not occur, even at low temperatures, and that the temperature dependence of the viscosity is as low as possible. The MLC displays of the prior art thus do not satisfy today's requirements.

Besides liquid-crystal displays which use backlighting, i.e. are operated transmissively and optionally transflectively, there is also particular interest in reflective liquid-crystal displays. These reflective liquid-crystal displays use the ambient light for information display. They thus consume significantly less energy than backlit liquid-crystal displays of corresponding size and resolution. Since the TN effect is characterized by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix addressed displays such as TFT displays. Here, as is already the case in the conventional transmissive TFT-TN displays, the use of liquid crystals of low birefringence ($\Delta n$) is necessary in order to achieve low optical retardation ($d \cdot \Delta n$). This low optical retardation results in a low viewing angle dependence of the contrast, which is usually acceptable (cf. DE 30 22 818). In reflective displays, the use of liquid crystals of low birefringence is much more important than in transmissive displays, since in reflective displays, the effective layer thickness, through which the light passes, is approximately twice as large as in transmissive displays of the same layer thickness.

Besides the lower power consumption (no need for backlight), other advantages of reflective displays over transmissive displays are the space saving, which results in a very low installation depth, and the reduction in problems arising from temperature gradients resulting from differences in heating caused by the backlight.

There thus continues to be a great demand for MLC displays which have a very high resistivity at the same time as a broad operating temperature range, short response times, even at low temperatures, and a low threshold voltage, and which do not have these disadvantages, or only do so to a reduced extent.

In TN (Schadt-Helfrich) cells, media are desired which facilitate the following advantages in the cells:

expanded nematic phase range (in particular down to low temperatures)

switchability at extremely low temperatures (outdoor use, automobile, avionics)

increased resistance to UV radiation (longer life)

lower threshold (addressing) voltage lower birefringence so as to improve the observation angle range.

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further extension of the parameter latitude available (clearing point, smectic-nematic transition or melting point, viscosity, dielectric parameters, elastic parameters) is urgently desired.

It is an object of the invention to provide media for these MLC, TN or STN displays, in particular for reflective MLC displays, which do not have the abovementioned disadvantages or only do so to a reduced extent, and preferably at the same time have very high resistivity values and low threshold voltages.

It has now been found that this object can be achieved by using media according to the invention in displays. The mixtures of the invention are particularly notable for their low threshold voltages.

Upon further study of the specification and appended claims, further objects and advantages of this invention will become apparent to those skilled in the art.

The invention thus relates to a liquid-crystalline medium based on a mixture of polar compounds having positive dielectric anisotropy, characterized in that it comprises one or more compounds of the general formula I

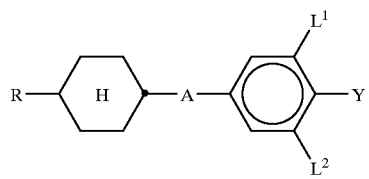

I in which

R is H, an alkyl or alkenyl radical having up to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

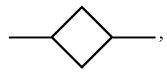

—C≡C—, —CO—, —CO—O—, —O—CO— or —O—CO—O— in such a way that O atoms are not linked directly to one another, $L^1$ and $L^2$ are each, independently of one another, H or F, -A- is

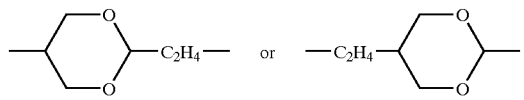

and

Y is F, Cl, halogenated alkyl, halogenated alkoxy, halogenated alkenyl, halogenated alkylalkoxy or halogenated alkenyloxy having up to 7 carbon atoms.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compounds in order, for example, to modify the dielectric and/or optical anisotropy of a dielectric of this type and/or to optimize its threshold voltage and/or its viscosity.

In the pure state, the compounds of the formula I are colourless and form liquid-crystalline mesophases in a temperature range which is favourably located for electro-optical use. They are stable chemically, thermally and to light.

Compounds of the formula I are embraced by the general formula in EP 0 441 932 B1, the disclosure of which is hereby incorporated by reference.

Particular preference is given to compounds of the formula I in which Y is F, Cl, $OCF_3$, $OCHF_2$, $OCF_2CF_3$ or $CF_2CHFCF_3$.

If R is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkenyl radical, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If R is an alkyl radical in which one $CH_2$ group has been replaced by —O— and one has been replaced by —CO—, these are preferably adjacent. These thus contain an acyloxy group —CO—O— or an oxycarbonyl group —O—CO—.

These are preferably straight-chain and have 2 to 6 carbon atoms. They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R is an alkenyl radical in which a $CH_2$ group adjacent an unsubstituted or substituted —CH=CH— group has been replaced by CO or CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If R is an alkyl or alkenyl radical which is monosubstituted by CN or $CF_3$, this radical is preferably straight-chain. The substitution by CN or $CF_3$ can be in any position.

If R is an alkyl or alkenyl radical which is at least monosubstituted by halogen, this radical is preferably straight-chain and halogen is preferably F or Cl. In the case of polysubstitution, halogen is preferably F. The resulting radicals also include perfluorinated radicals. In the case of monosubstitution, the fluoro or chloro substituent can be in any desired position, but is preferably in the ω-position.

Compounds of the formula I which contain pendant groups R which are suitable for polymerization reactions are suitable for the preparation of liquid-crystalline polymers.

Compounds of the formula I containing branched pendant groups R may occasionally be of importance owing to better solubility in the conventional liquid-crystalline base materials, but in particular as chiral dopants if they are optically active. Smectic compounds of this type are suitable as components for ferroelectric materials.

Compounds of the formula I having $S_A$ phases are suitable, for example, for thermally addressed displays.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If R is an alkyl radical in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formula I are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail.

The invention furthermore relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell) which contain media of this type, and to the use of these media for electro-optical purposes.

The liquid-crystal mixtures according to the invention allow a significant extension of the parameter latitude which is available.

The achievable combinations of clearing point, viscosity at low temperature, thermal and UV stability and optical anisotropy and threshold voltage are far superior to current prior art materials.

The requirement for a high clearing point, nematic phase at low temperature and simultaneously a low threshold voltage has hitherto only been met inadequately. Although liquid-crystal mixtures such as MLC-6476 and MLC-6625 (Merck KGaA, Darmstadt, Germany) have comparable clearing points and low-temperature stabilities, they have, however, much higher threshold voltages of about $\geq 1.7$ V.

While maintaining the nematic phase down to −20° C., preferably down to −30° C., particularly preferably down to −40° C., the liquid-crystal mixtures according to the invention allow clearing points above 70° C., preferably above 80° C., simultaneously birefringence values of $\leq 0.100$, preferably $\leq 0.095$, in particular $\leq 0.090$, and a significantly lower threshold voltage to be achieved, allowing excellent STN and MLC displays, in particular reflective MLC displays, to be achieved. In particular, the mixtures are characterized by low operating voltages. The TN thresholds are at about 1.5 V, preferably below 1.4 V, particularly preferably $\leq 1.3$ V. Reflective MLC mixtures are particularly notable for TN thresholds <1.5 V.

It goes without saying that a suitable choice of the components of the mixtures according to the invention also allows higher clearing points (for example above 110° C.) to be achieved at the same time as lower dielectric anisotropy values and thus higher threshold voltages, or lower clearing points to be achieved at the same time as higher dielectric anisotropy values (for example >12) and thus lower threshold voltages (for example <1.5 V) while retaining the other advantageous properties. Likewise, mixtures of higher $\Delta\epsilon$ and thus lower thresholds can be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher resistivity values can be achieved using the mixtures according to the invention at the first minimum than in the case of mixtures comprising cyano compounds. A person skilled in the art can use simple routine methods to produce the birefringence necessary for a specified layer thickness of the MLC display by suitable choice of the individual components and their proportions by weight. The requirements of reflective MLC displays have been described, for example, in Digest of Technical Papers, SID Symposium 1998.

The rotational viscosity $\gamma_1$ at 20° C. is preferably <220 mPa.s, particularly preferably <190 mPa.s. The nematic phase range is preferably at least 100°, in particular at least 110°. This range preferably extends at least from −30° to +70°.

Measurements of the capacity holding ratio, also known as the voltage holding ratio (HR) [S. Matsumoto et al., Liquid Crystals 5 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an HR which is sufficient for MLC displays.

The media according to the invention preferably contain a plurality (preferably two or more) of compounds of the formula I, i.e. the proportion of these compounds is 5–50%, preferably 5–40%, particularly preferably in the range 5–35%.

The individual compounds of the formulae I to XVI and their subformulae which can be used in the media according to the invention are either known or can be prepared analogously to the known compounds.

Preferred embodiments are indicated below:

Mixture comprising one or more compounds of the formulae I1 to I60:

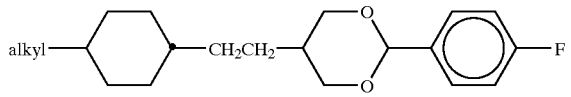

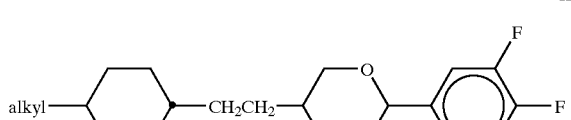

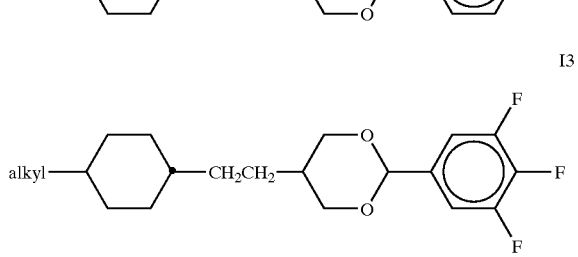

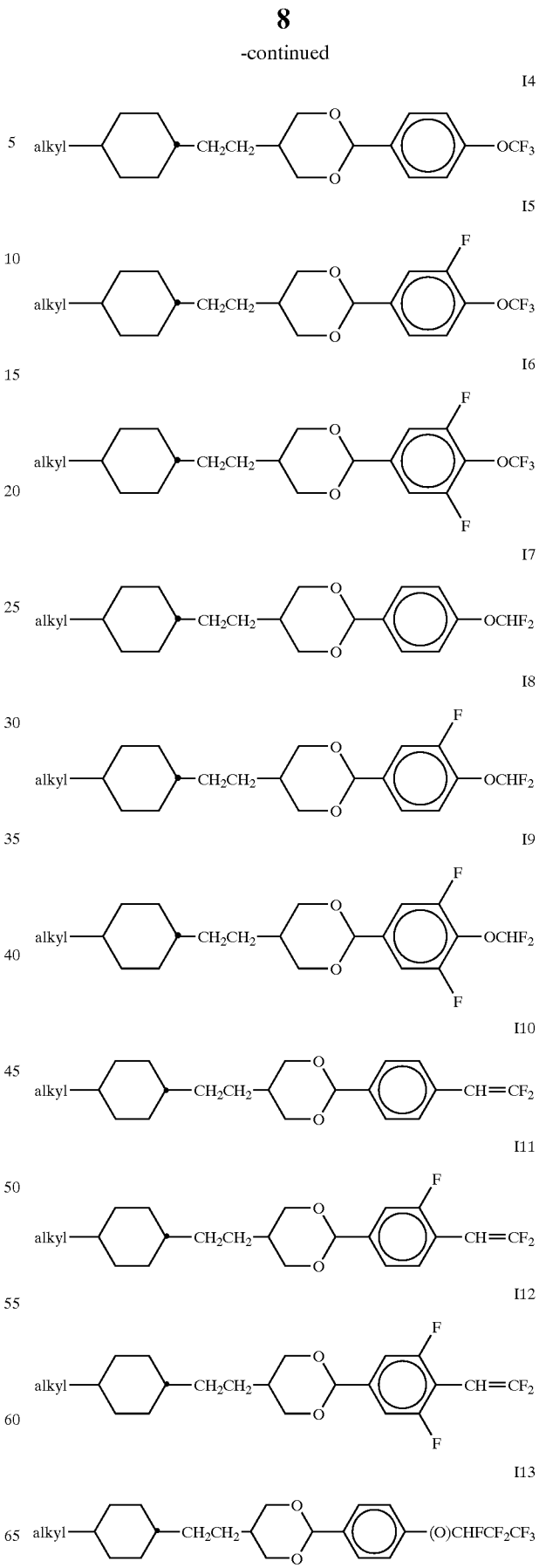

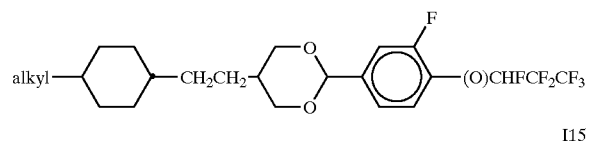
I14
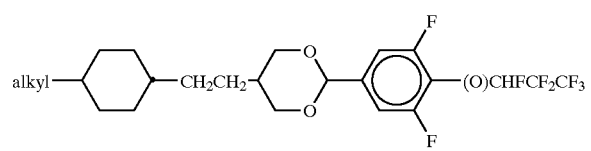
I15
I16
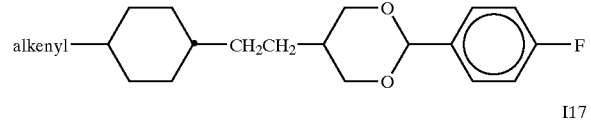
I17
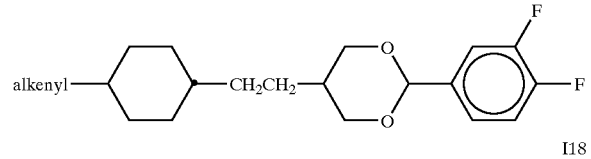
I18
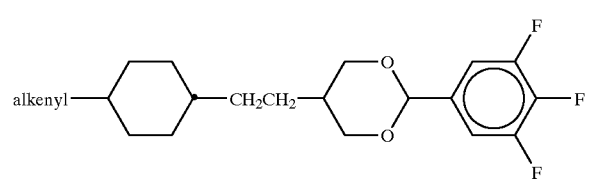
I19
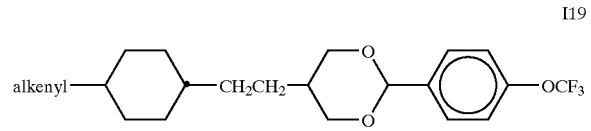
I20
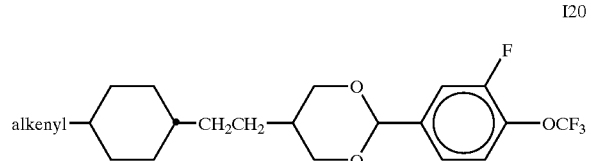
I21
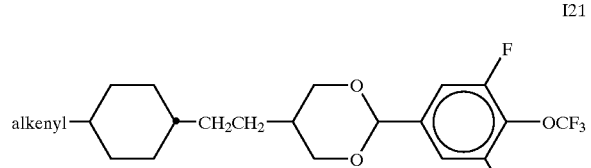
I22
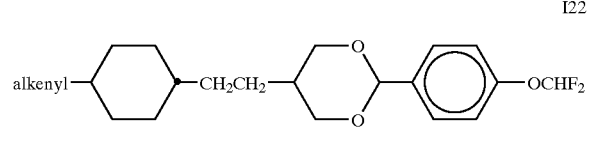
I23
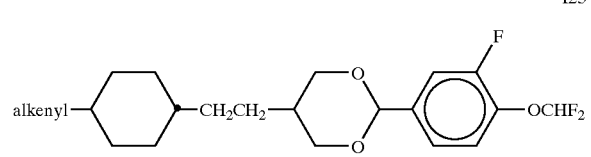
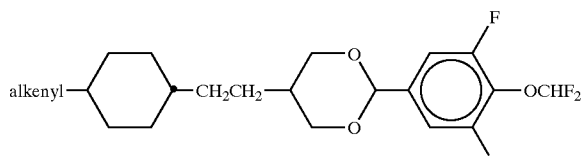
I24
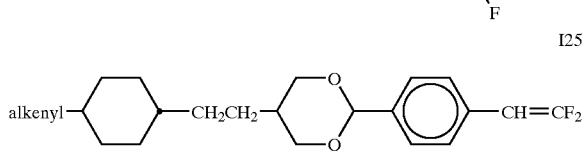
I25
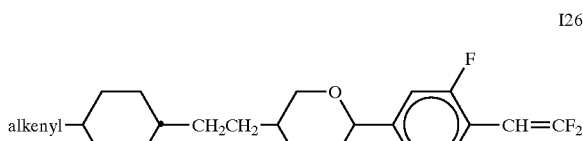
I26
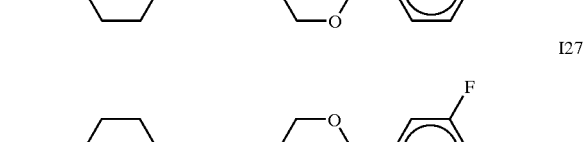
I27
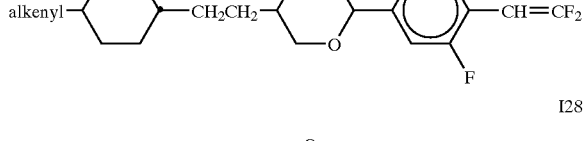
I28
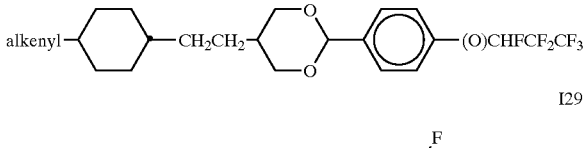
I29
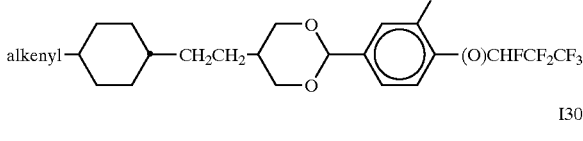
I30
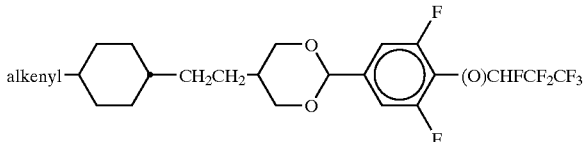
I31
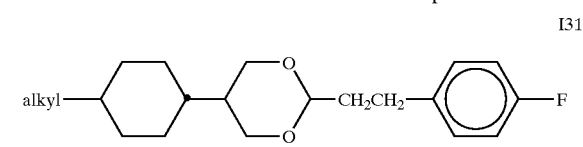
I32
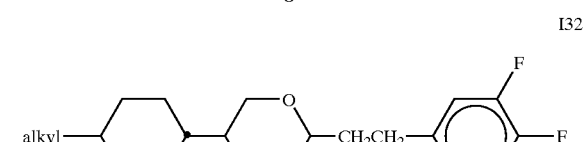
I33
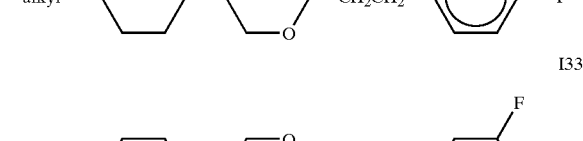
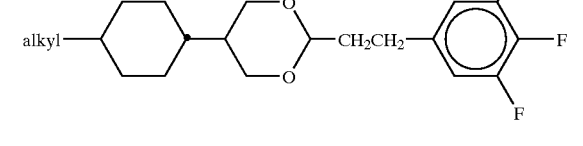

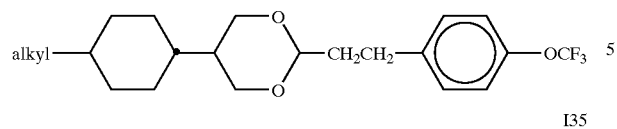
I34
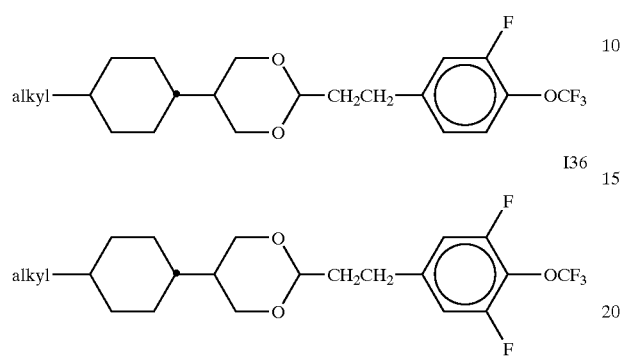
I35
I36
I37
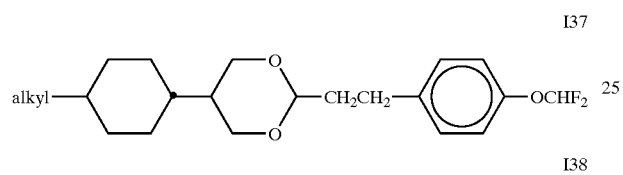
I38
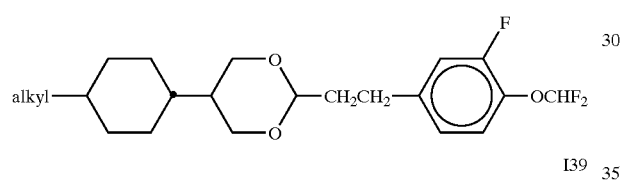
I39
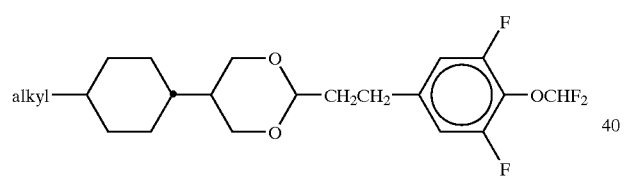
I40
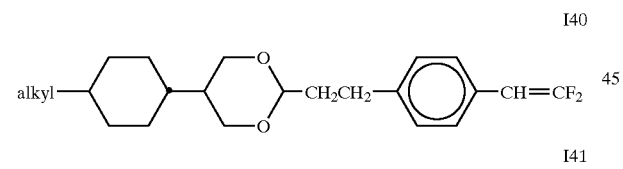
I41
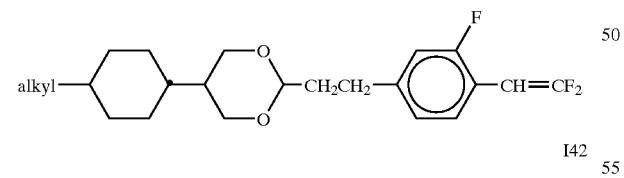
I42
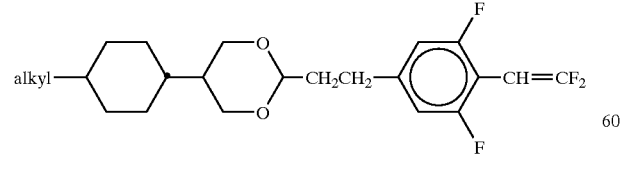
I43
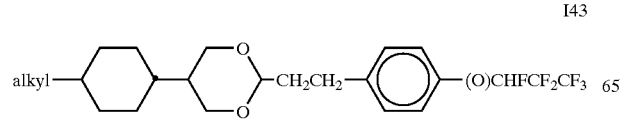
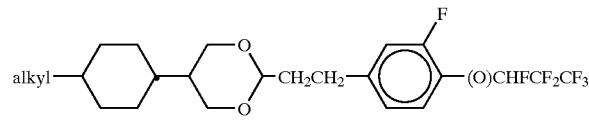
I44
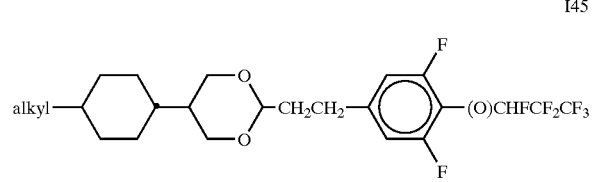
I45
I46
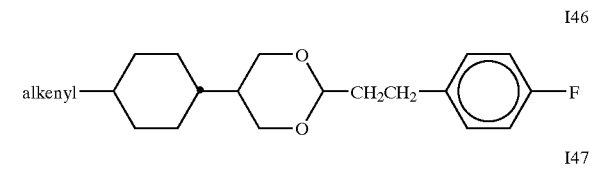
I47
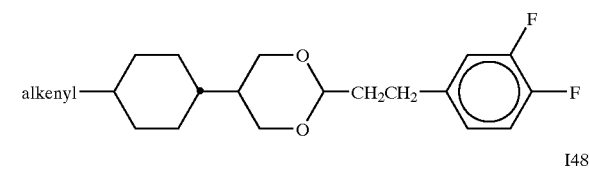
I48
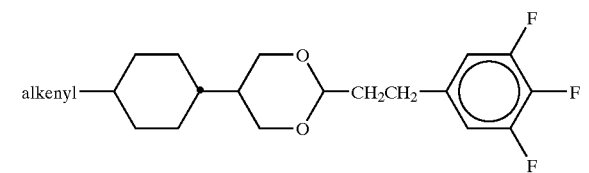
I49
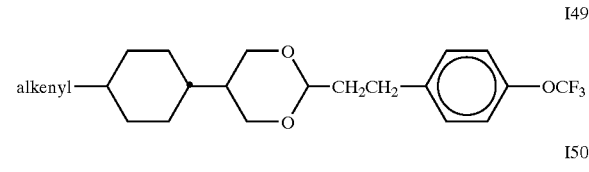
I50
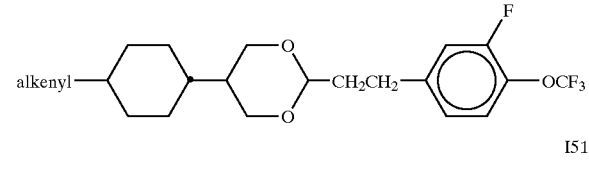
I51
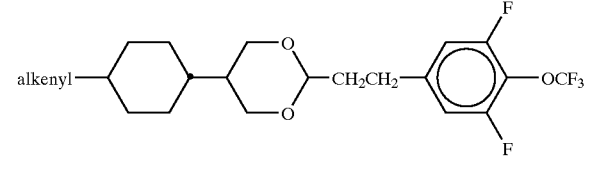
I52
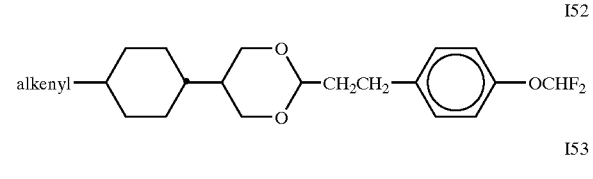
I53
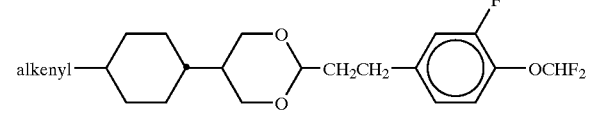

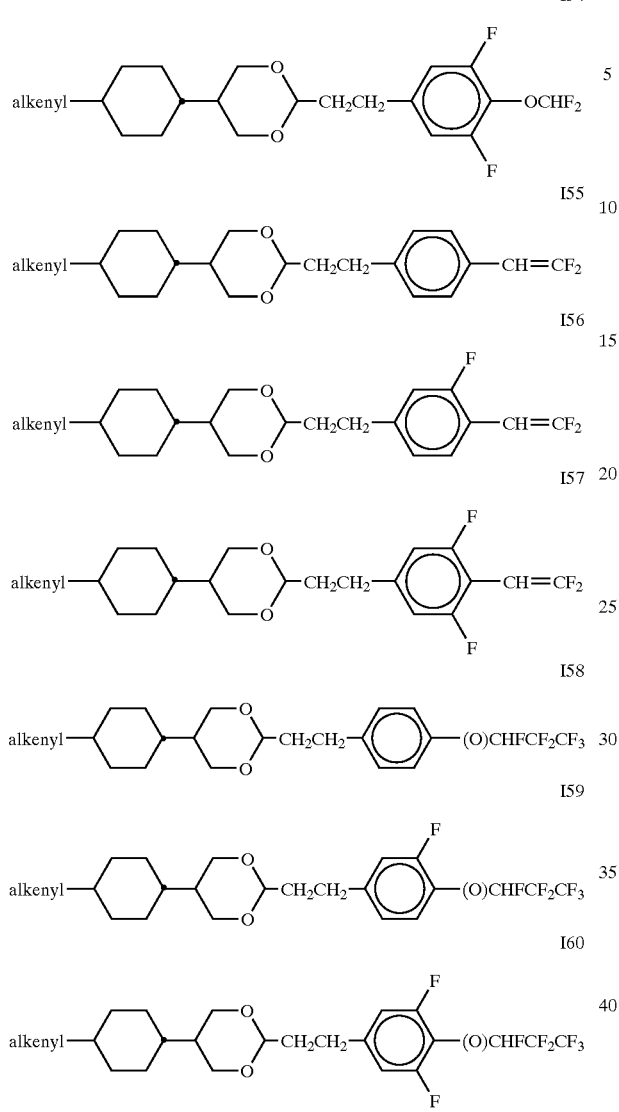
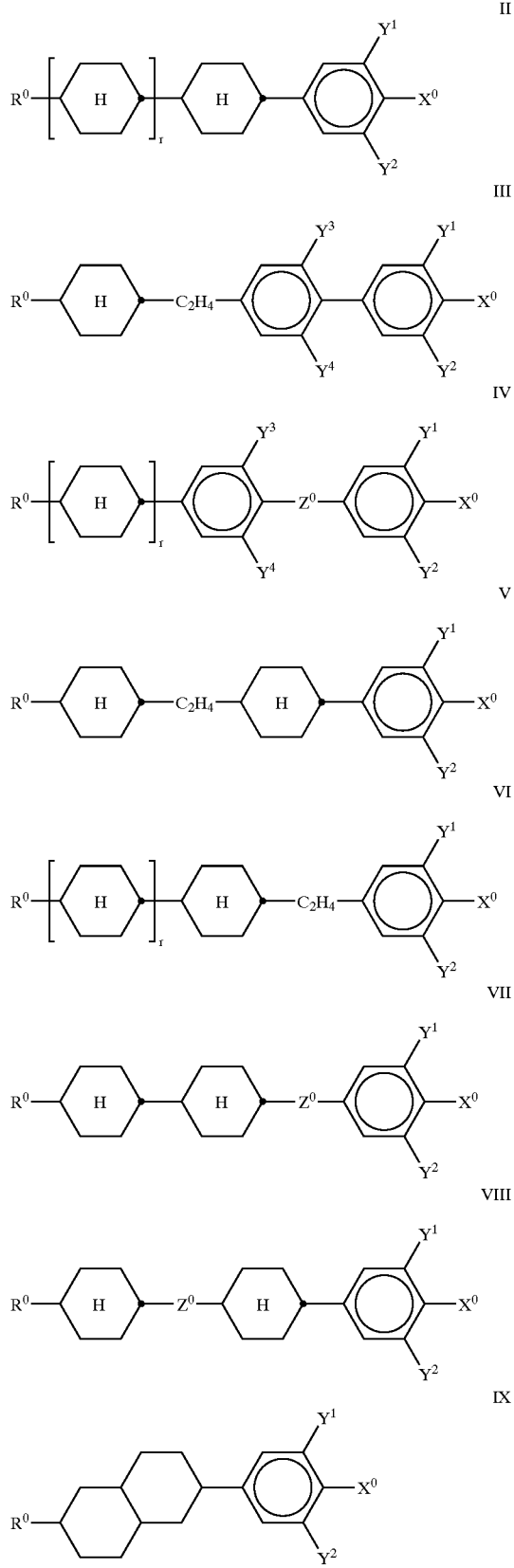

in which alkyl is a straight-chain alkyl radical having 1–8 carbon atoms and alkenyl is a 1E- or 3E-alkenyl radical having 2–8 carbon atoms;

In the media according to the invention comprising compounds of the formula I, Y is preferably F, Cl, $OCF_3$, $OCHF_2$, $CF_3$, $CHFCF_3$, $CF_2CHF_2$, $C_2H_4CHF_2$, $CF_2CH_2CF_3$, $CHF_2$, $OCH_2CF_3$, $OCH_2CHF_2$, $OCF_2CHF_2$, $O(CH_2)_3CF_3$, $OCH_2C_2F_5$, $OCH_2CF_2CHF_2$, $OCH_2C_3F_7$, $OCHFCF_3$, $OC_2F_5$, $OCF_2CHFCF_3$, $OCH_2CF_2CHFCF_3$, $OCH=CF_2$, $OCF=CF_2$, $OCF=CFCF_3$, $OCF=CF-C_2F_5$, $CH=CHF$, $CH=CF_2$, $CF=CF_2$, $CF_2OCF_3$, in particular F, $OCHFCF_3$, $OCF_3$, $OCHF_2$, $OC_2F_5$, $OC_3F_7$, $OCH=CF_2$ and $CF_2OCF_3$.

Particular preference is given to compounds of the formula I in which $L^1$ and/or $L^2$ is/are fluorine.

The medium preferably comprises one or more compounds of the formulae I2, I3, I4, I5, I6, I8, I9, I14, I15, I17, I18, I20, I21, I23, I24, I32, I33, I34, I36, I47, I48, I50 and/or I51;

The medium additionally comprises one or more compounds selected from the group consisting of the general formulae II to IX:

in which the individual radicals have the following meanings:

| | |
|---|---|
| R⁰ | is n-alkyl, oxaalkyl, fluoroalkyl or alkenyl, in each case having up to 9 carbon atoms; |
| X⁰ | is F, Cl, halogenated alkyl or alkoxy having 1 to 6 carbon atoms or halogenated alkenyl having 2 to 6 carbon atoms; |
| Z⁰ | is —C₄H₈—, —CF₂O—, —OCF₂—, —CF═CF— or —C₂F₄—; |
| Y¹, Y², Y³ and Y⁴ | are each, independently of one another, H or F, and |
| r | is 0 or 1. |

The medium preferably comprises two, three, four or five compounds of the formula II;

The medium preferably comprises one or more compounds of the formulae IIa to IIh:

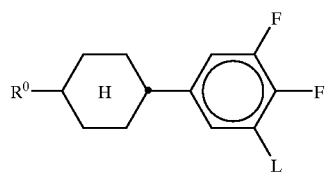

IIa

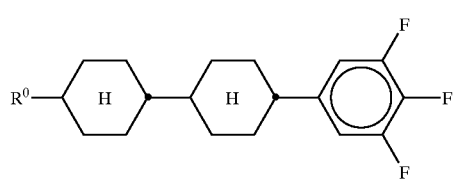

IIb

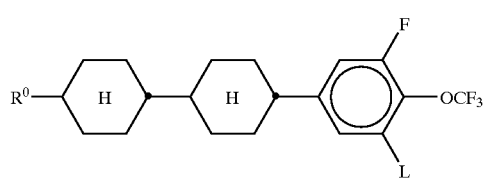

IIc

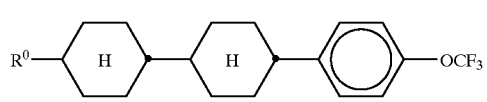

IId

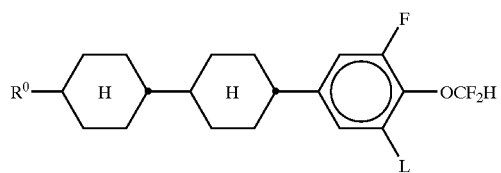

IIe

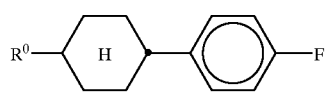

IIf

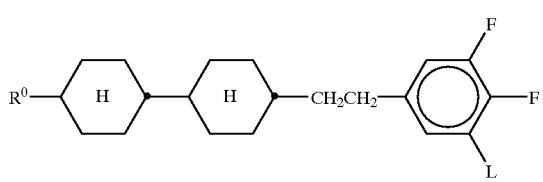

IIg

-continued

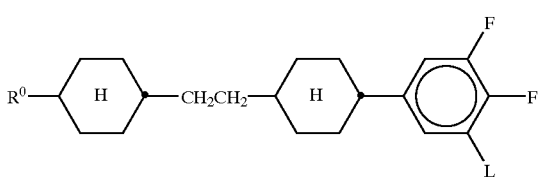

IIh

The medium preferably comprises one or more compounds of formula IVa to IVg

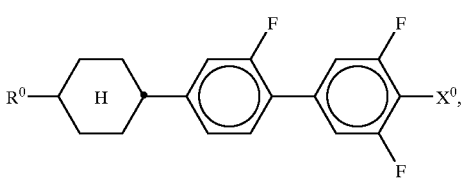

IVa

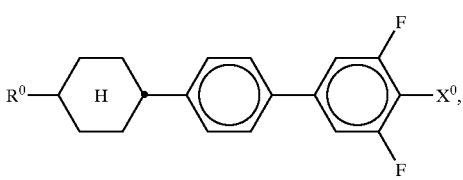

IVb

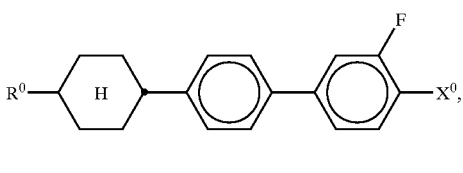

IVc

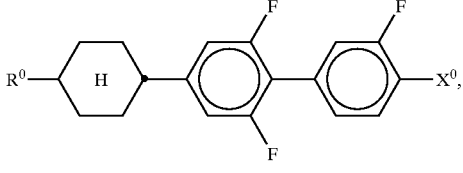

IVd

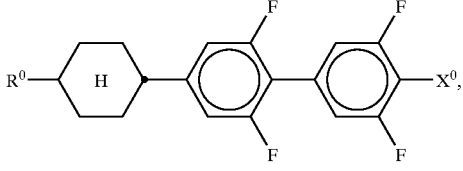

IVe

IVf

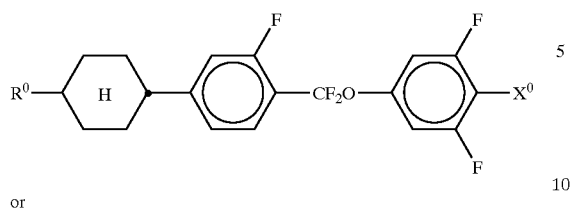

or

IVg

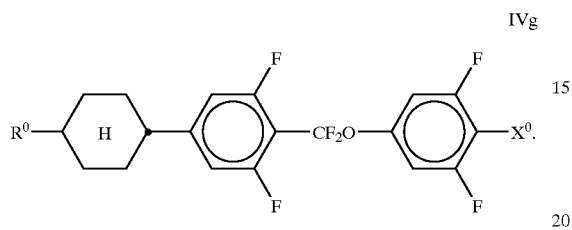

The medium additionally comprises one or more compounds selected from the group consisting of the general formulae X to XVI:

X

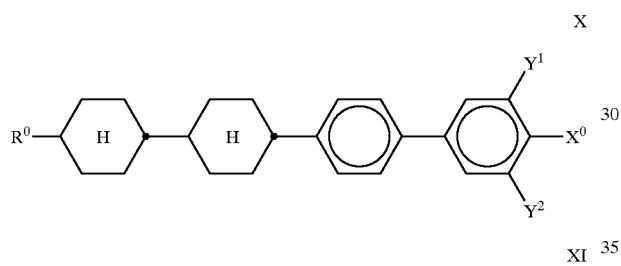

XI

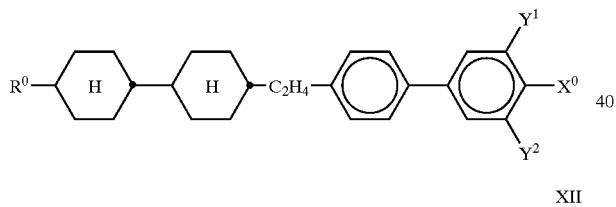

XII

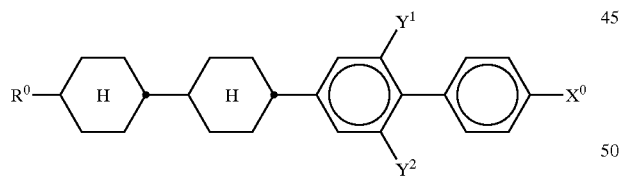

XIII

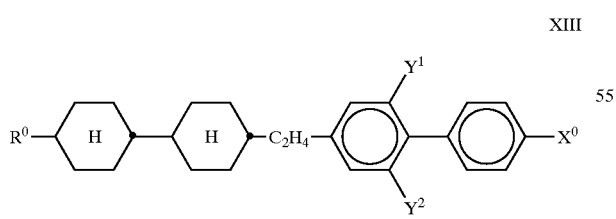

XIV

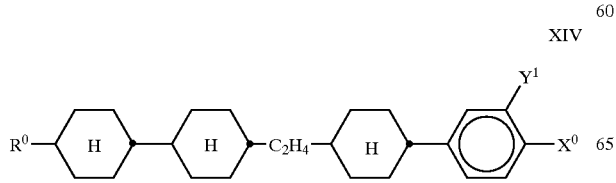

XV

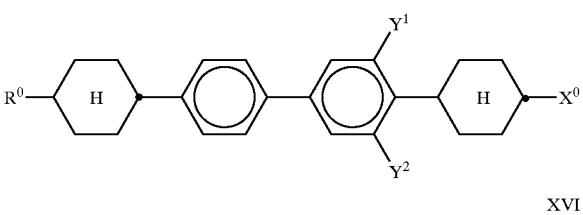

XVI

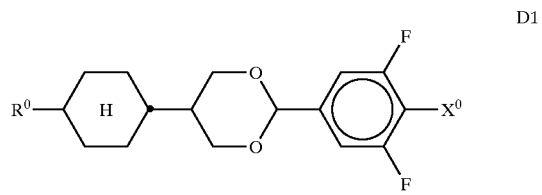

in which $R^0$, $X^0$, $Y^1$ and $Y^2$ are each, independently of one another, as defined in formulae II to IX. $X^3$ is preferably F, Cl, $CF_3$, $OCF_3$ or $OCHF_2$. $R^0$ is preferably alkyl, oxaalkyl, fluoroalkyl or alkenyl, in each case having up to 6 carbon atoms.

The medium additionally comprises one or more compounds of the formulae D1 and/or D2

D1

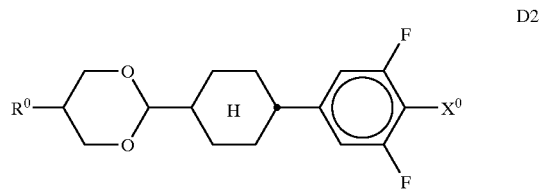

D2

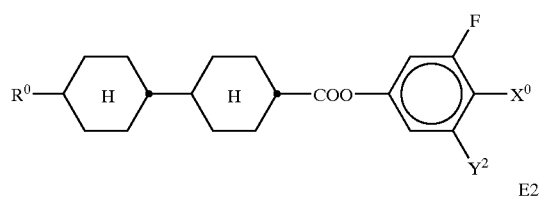

in which $R^0$ and $X^0$ are as defined above;

The medium additionally comprises one or more ester compounds of the formulae E1 to E5:

E1

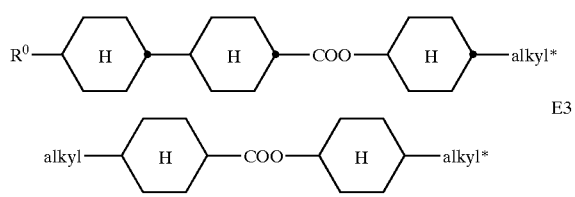

E2

E3

-continued

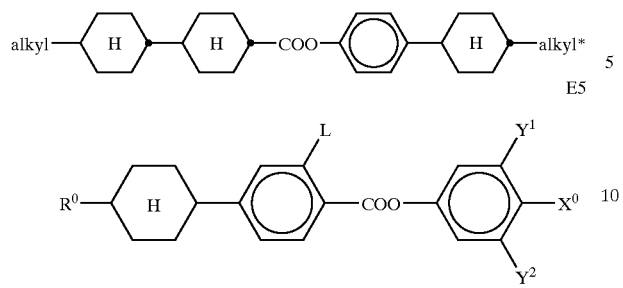

in which $R^0$, $X^0$, $Y^1$ and $Y^2$ are as defined above, L is H or F, alkyl and alkyl* are each, independently of one another, a straight-chain alkyl radical having 1–8 carbon atoms.

The medium additionally comprises one or more compounds of the formulae Xa to Xf:

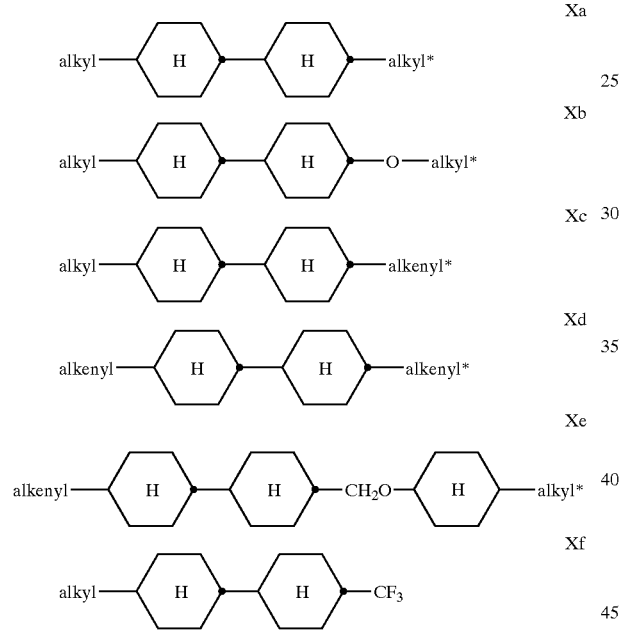

in which alkyl and alkyl* are each, independently of one another, a straight-chain alkyl radical having 1–8 carbon atoms, and
alkenyl and alkenyl* are each, independently of one another, a 1E- or 3E-alkenyl radical having 2–8 carbon atoms.

The medium comprises one or more compounds of the formula E1a

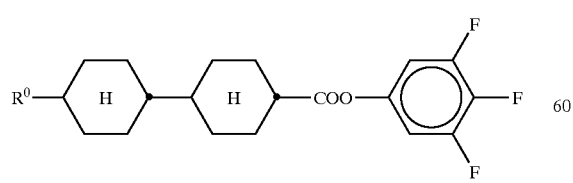

in which $R^0$ is as defined above.

The proportion of compounds of the formulae I to IX together in the total mixture is at least 50% by weight;

The proportion of compounds of the formula I in the total mixture is from 5 to 50% by weight;

The proportion of compounds of the formulae II to IX in the total mixture is from 20 to 80% by weight;

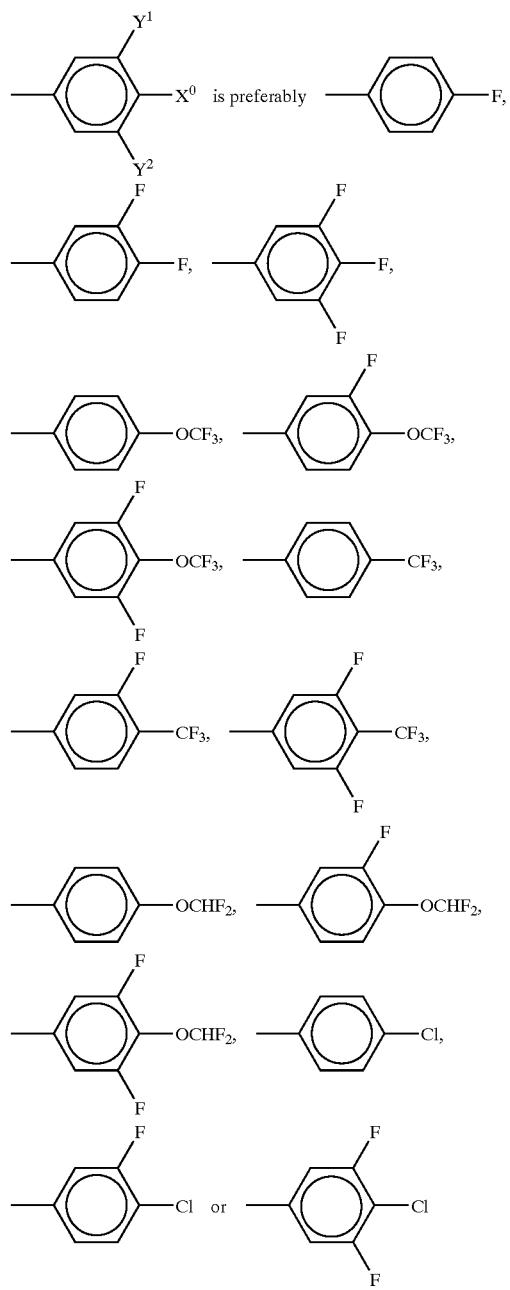

The medium comprises compounds of the formulae II, III, IV, V, VI, VII, VIII or IX;

$R^0$ is straight-chain alkyl or alkenyl having 2 to 7 carbon atoms;

The medium consists essentially of compounds of the formulae I to IX;

The medium comprises further compounds, preferably selected from the following group consisting of the general formulae XVII to XXI:

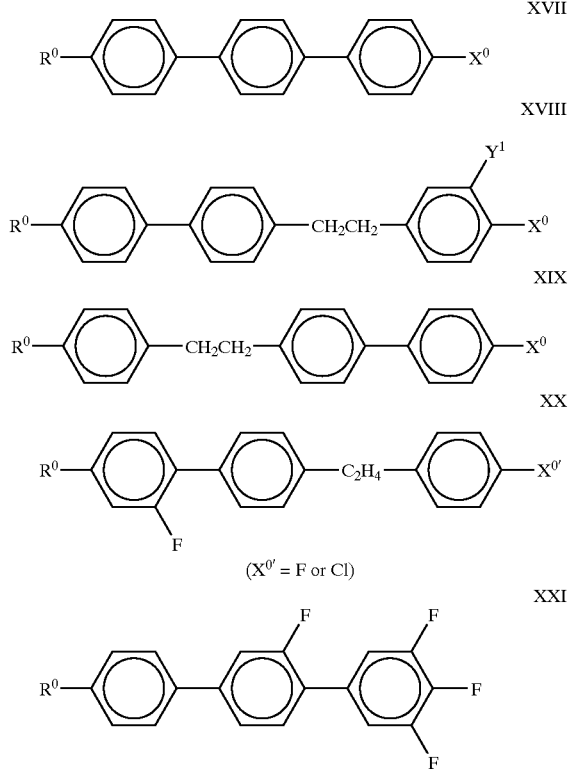

in which R⁰, Y¹ and X⁰ are as defined above and the 1,4-phenylene rings can be substituted by CN, chlorine or fluorine. The 1,4-phenylene rings are preferably monosubstituted or polysubstituted by fluorine atoms.

The weight ratio I:(II+III+IV+V+VI+VII+VIII+IX) is preferably from 1:10 to 10:1.

The medium consists essentially of compounds selected from the group consisting of the general formulae I to XVI.

The proportion of compounds of the formulae Xa to Xd in the total mixture is 3–45% by weight, preferably 5–40% by weight, in particular 5–30% by weight.

The proportion of compounds of the formula E1 in the total mixture is 10–60% by weight, preferably 10–45% by weight, in particular 15–40% by weight.

The proportion of compounds of the formulae E2 and/or E3 in the total mixture is 1–30% by weight, preferably 3–20% by weight, in particular 3–15% by weight.

The proportion of compounds of the formula E4 is preferably ≦20% by weight, in particular ≦10% by weight.

It has been found that even a relatively small proportion of compounds of the formula I mixed with conventional liquid-crystal materials, but in particular with one or more compounds of the formula II, III, IV, V, VI, VII, VIII and/or IX, leads to a decrease in the threshold voltage and to low birefringence values, where broad nematic phases with low smectic-nematic transition temperatures are simultaneously observed, which drastically improves the storage stability. Particularly preferred are mixtures which, in addition to one or more compounds of the formula I, comprise one or more compounds of the formula IV, in particular compounds of the formula IVa, where X⁰ is F or OCF₃.

The compounds of the formulae I to IX are colourless, stable and readily miscible with one another and with other liquid-crystalline materials. The term "alkyl" or "alkyl*" encompasses straight-chain and branched alkyl groups having 1–7 carbon atoms, particularly the straight-chain groups methyl, ethyl, propyl, butyl, pentyl, hexyl and heptyl. Groups having 2–5 carbon atoms are generally preferred.

The term "alkenyl" or "alkenyl*" encompasses straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

The term "oxaalkyl" preferably encompasses straight-chain radicals of the formula $C_nH_{2n+1}$—O—$(CH_2)_m$, where n and m are each, independently of one another, from 1 to 6. Preferably, n=1 and m is 1 to 6.

A suitable choice of the meanings of R⁰ and X⁰ allows the response times, the threshold voltage, the slope of the transmission characteristic lines etc. to be modified as desired. For example, 1E-alkenyl radicals, 3E-alkenyl radicals, 2E-alkenyloxy radicals and the like generally result in shorter response times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally result in lower threshold voltages and smaller values of $k_{33}/k_{11}$ compared with alkyl and alkoxy radicals.

The optimum weight ratio of compounds of the formulae I and II+III+IV+V+VI+VII+VIII+IX largely depends on the desired properties, on the choice of the components of the formulae I, II, III, IV, V, VI, VII, VIII and/or IX, and on the choice of any other components which may be present. Suitable weight ratios within the range given above can easily be determined from case to case.

The total amount of compounds of the formulae I to XVI in the mixtures according to the invention is not critical. The mixtures can therefore comprise one or more further components in order to optimize various properties. However, the observed effect on the response times and the threshold voltage is usually greater the higher the total concentration of compounds of the formulae I to XVI.

In a particularly preferred embodiment, the media according to the invention comprise compounds of the formulae II to IX (preferably II, III and/or IV, especially IVa) in which X⁰ is F, OCF₃, OCHF₂, F, OCH=CF₂, OCF=CF₂ or OCF₂—CF₂H. A favourable synergistic effect with the compounds of the formula I results in particularly advantageous properties. Mixtures comprising compounds of the formula I and of the formula IVa are particularly notable for their low threshold voltages.

The construction of the STN or MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM and especially reflective displays.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in other conventional manners, for example by using pre-mixtures, for example homologue mixtures, or using so-called "multi-bottle" systems.

The dielectrics may also comprise further additives known to the person skilled in the art and described in the literature. For example, 0–15%, preferably 0–10%, of pleochroic dyes, chiral dopants stabilizers and/or antioxidants can be added. The additives are each employed in concentrations of from 0.01 to 6%, preferably from 0.1 to 3%.

However, the concentration data for the other constituents of the liquid-crystal mixtures, i.e. of the liquid-crystalline or mesogenic compounds, are given without taking into account the concentration of these additives.

In the present application and in the following examples, the structures of the liquid-crystal compounds are specified by acronyms, which are transformed into chemical formulae according to the following Tables A and B. All radicals $C_nH_{2n+1}$ and $C_mH_{2m+1}$ are straight-chain alkyl radicals having n or m C atoms; n and m are each an integer, preferably 0, 1, 2, 3, 4, 5, 6, 7, 8, 9, 10, 11 or 12. The coding according to Table B is self-evident. Table A specifies the acronym for the parent body only. In individual cases, the acronym for the parent body is followed, separated therefrom by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| V-T | $CH_2$=CH | CF$_3$ | H | H |
| V2-T | $CH_2$—CH—$C_2H_4$ | CF$_3$ | H | H |
| 1V-OT | $CH_3$—CH=CH | OCF$_3$ | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred mixture components are shown in Tables A and B.

TABLE A

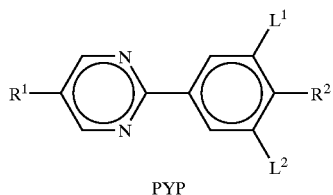

PYP

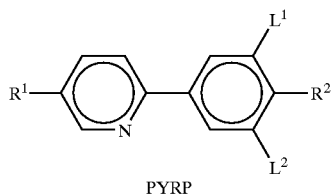

PYRP

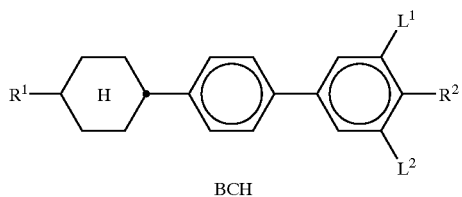

BCH

CBC

TABLE A-continued
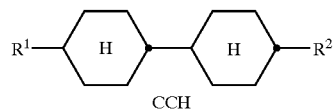
CCH
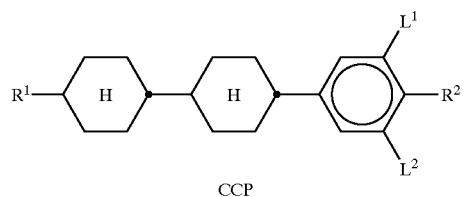
CCP
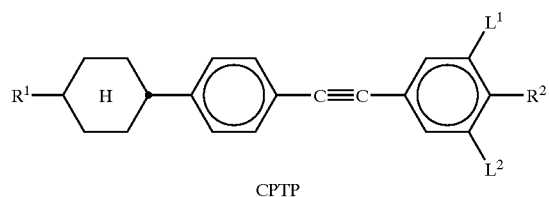
CPTP
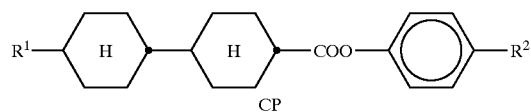
CP
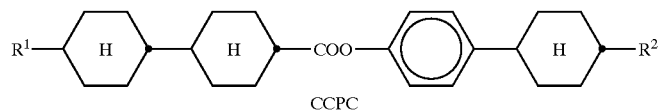
CCPC
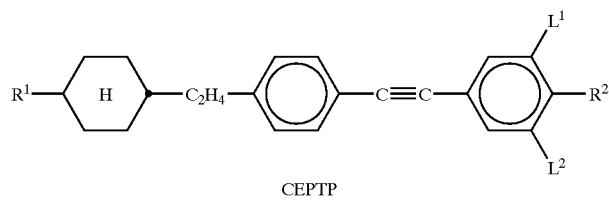
CEPTP
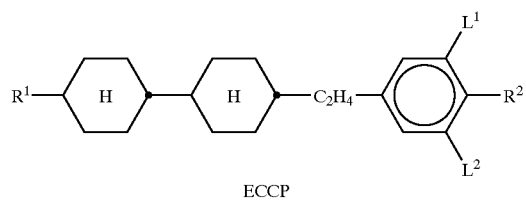
ECCP
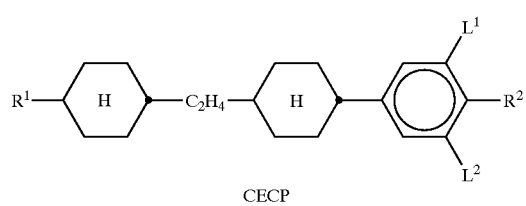
CECP TABLE A-continued
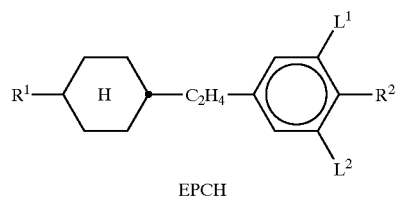
EPCH
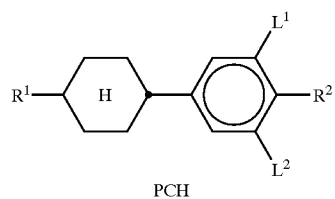
PCH
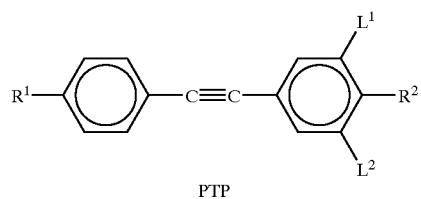
PTP
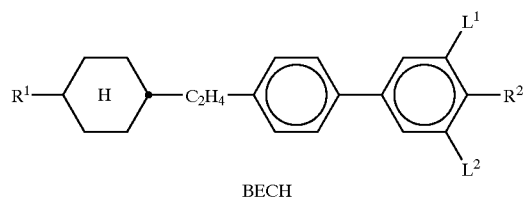
BECH
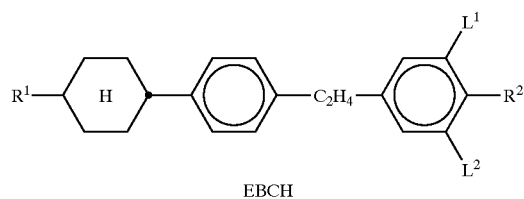
EBCH
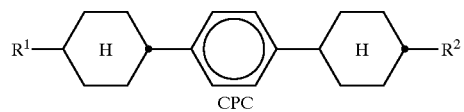
CPC
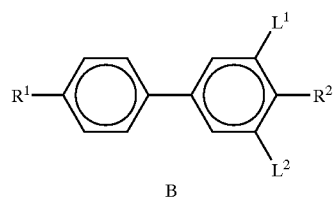
B
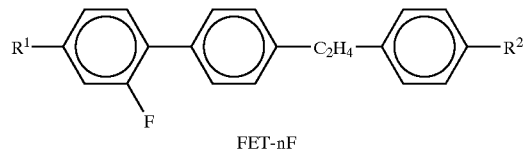
FET-nF TABLE A-continued
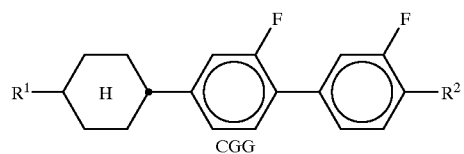
CGG
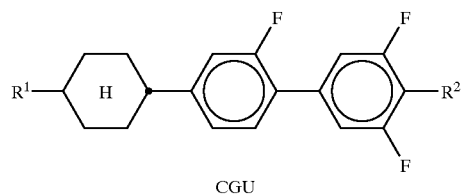
CGU
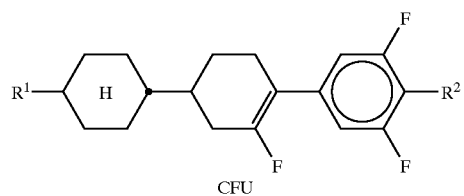
CFU
TABLE B
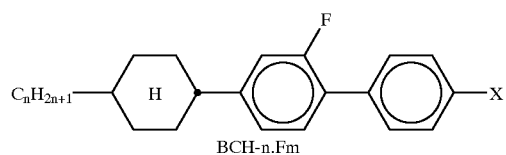
BCH-n.Fm
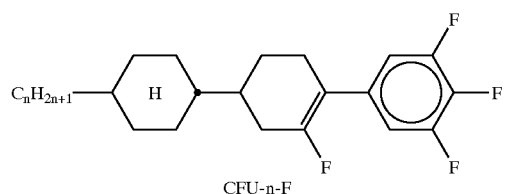
CFU-n-F
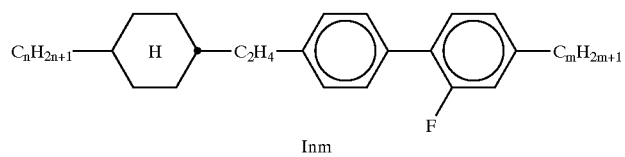
Inm
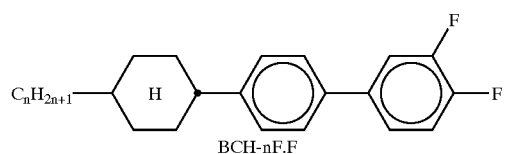
BCH-nF.F
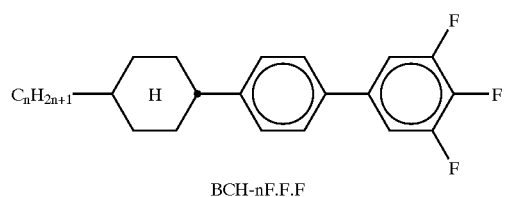
BCH-nF.F.F TABLE B-continued
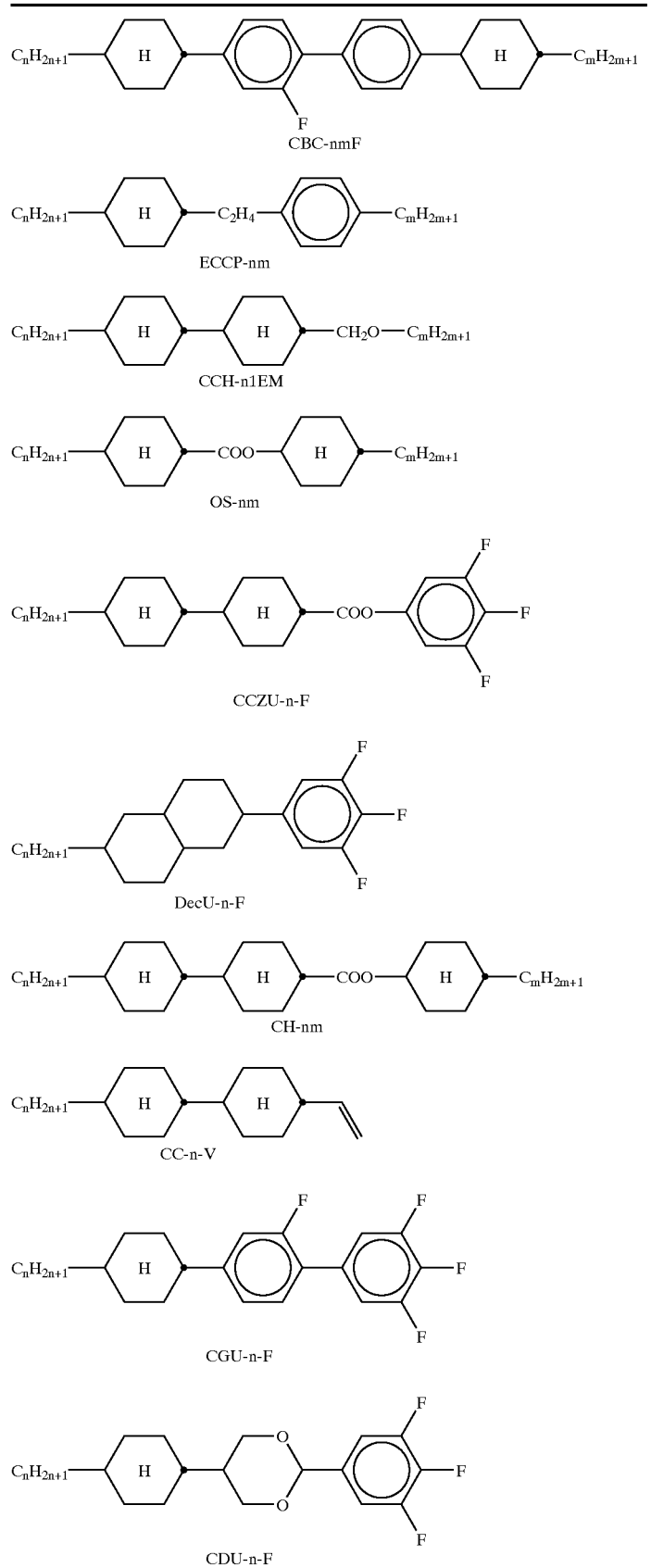

TABLE B-continued
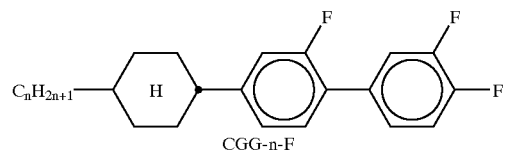
CGG-n-F
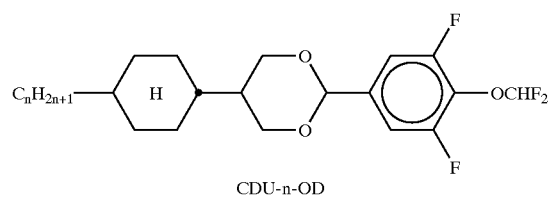
CDU-n-OD
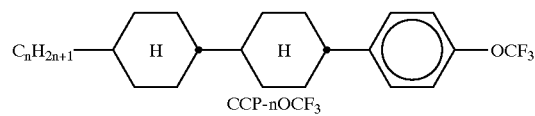
CCP-nOCF$_3$
CC-1V-V1
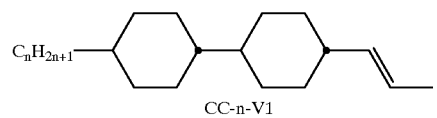
CC-n-V1
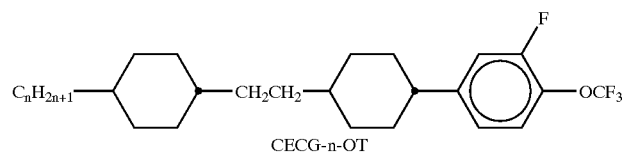
CECG-n-OT
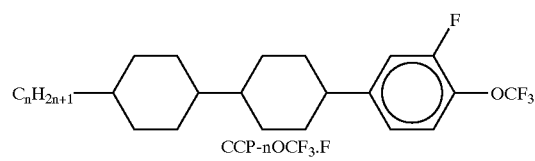
CCP-nOCF$_3$.F
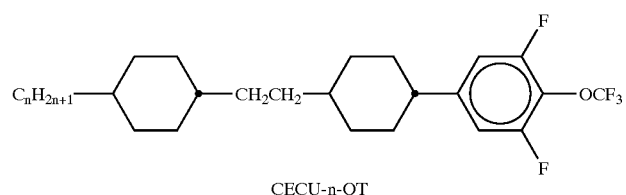
CECU-n-OT
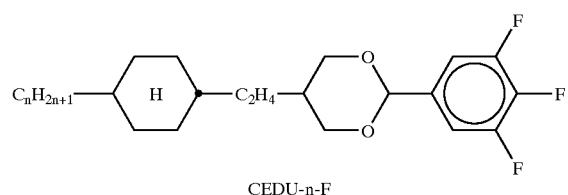
CEDU-n-F TABLE B-continued

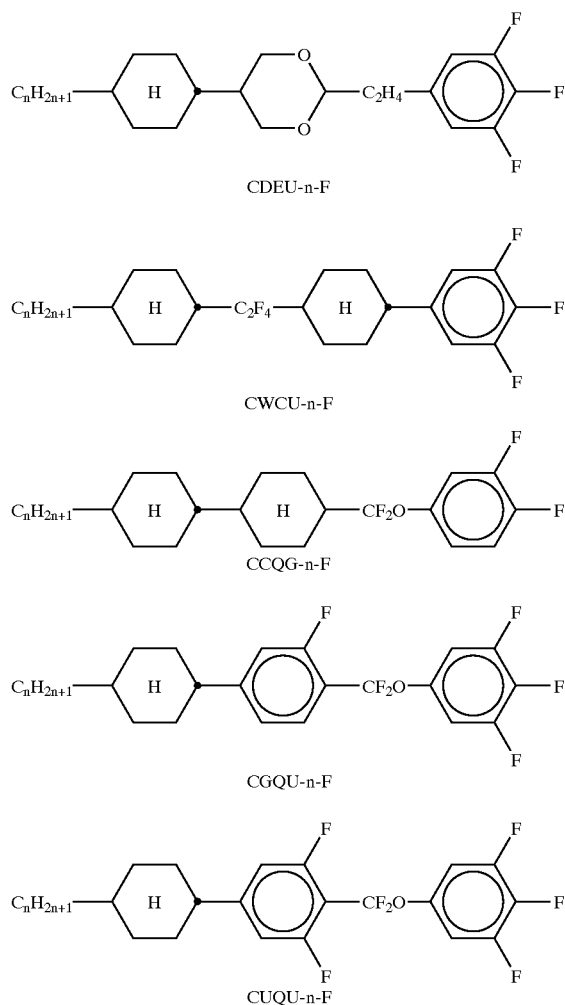

CDEU-n-F

CWCU-n-F

CCQG-n-F

CGQU-n-F

CUQU-n-F

Without further elaboration, it is believed that one skilled in the art can, using the preceding description, utilize the present invention to its fullest extent. The following preferred specific embodiment are, therefore, to be construed as merely illustrative, and not limitative of the remainder of the disclosure in any way whatsoever.

The entire disclosures of all applications, patents and publications, cited above and of corresponding German Patent application No. 100 14 293.1, filed Mar. 23, 2000, are hereby incorporated by reference.

The following examples are intended to illustrate the invention without limiting it. Hereinbefore and hereinafter, percentages are given in per cent by weight. All temperatures are specified in degrees Celsius. m.p. denotes melting point, cl.p.=clearing point. Furthermore, C=crystalline state, N=nematic phase, S=smectic phase and I=isotropic phase. The data between these symbols represent the transition temperatures. The optical anisotropy (589 nm, 20° C.), and the flow viscosity $v_{20}$ (mm²/sec) and the rotational viscosity $\gamma_1$ (mPa·s) were each determined at 20° C.

$V_{10}$ denotes the voltage for 10% transmission (viewing direction perpendicular to the plate surface). $t_{on}$ denotes the on time and $t_{off}$ the off time at an operating voltage corresponding to twice the value of $V_{10}$. $\Delta n$ denotes the optical anisotropy and $n_o$ the refractive index. $\Delta\epsilon$ denotes the dielectric anisotropy ($\Delta\epsilon=\epsilon_{\parallel}-\epsilon_{\perp}$, where $\epsilon_{\parallel}$ is the dielectric constant parallel to the longitudinal axes of the molecule and $\epsilon_{\perp}$ is the dielectric constant perpendicular thereto). The electro-optical data were measured in a TN cell in the 1st minimum (i.e. at a d·$\Delta n$ value of 0.5) at 20° C., unless expressly stated otherwise. The optical data were measured at 20° C., unless expressly stated otherwise.

MIXTURE EXAMPLES

Example A

| | | | |
|---|---|---|---|
| CCH-303 | 11.00% | S → N [° C.]: | <−40 |
| CCH-501 | 17.00% | Clearing point [° C.]: | +84.5 |
| CH-33 | 3.00% | $\Delta n$ [589 nm, 20° C.]: | +0.0628 |
| CH-35 | 3.00% | $\Delta\epsilon$ [1 kHz, 20° C.]: | +9.2 |
| CH-45 | 3.00% | $\gamma_1$ [mPa.s, 20° C.]: | 175 |
| CCP-5F.F.F | 3.00% | d.$\Delta n$ [µm]: | 0.50 |
| CCZU-2-F | 6.00% | Twist [°]: | 90 |
| CCZU-3-F | 16.00% | $V_{10}$ [V]: | 1.49 |
| CCZU-5-F | 6.00% | | |
| CCPC-34 | 2.00% | | |
| CEDU-3-F | 15.00% | | |
| CEDU-5-F | 15.00% | | |

Example B

| | | | |
|---|---|---|---|
| CCH-301 | 9.00% | S → N [° C.]: | <−30 |
| CC-5-V | 4.00% | Clearing point [° C.]: | +81.5 |
| CH-33 | 3.00% | Δn [589 nm, 20° C.]: | +0.0682 |
| CCP-2F.F.F | 11.00% | Δε [1 kHz, 20° C.]: | +11.8 |
| CCP-3F.F.F | 10.00% | γ$_1$ [mPa.s, 20° C.]: | 175 |
| CCZU-2-F | 6.00% | d.Δn [μm]: | 0.50 |
| CCZU-3-F | 18.00% | Twist [°]: | 90 |
| CCZU-5-F | 6.00% | V$_{10}$ [V]: | 1.19 |
| CCPC-34 | 3.00% | | |
| CEDU-3-F | 15.00% | | |
| CEDU-5-F | 15.00% | | |

Example C

| | | | |
|---|---|---|---|
| CCP-3F.F.F | 9.00% | S → N [° C.]: | <−40 |
| CCP-3OCF3 | 8.00% | Clearing point [° C.]: | +75.0 |
| CCP-5OCF3 | 2.00% | Δn [589 nm, 20° C.]: | +0.0935 |
| CCP-3OCF3.F | 11.00% | Δε [1 kHz, 20° C.]: | +13.4 |
| CGU-2-F | 9.00% | d.Δn [μm]: | 0.50 |
| CGU-3-F | 11.00% | Twist [°]: | 90 |
| CGU-5-F | 10.00% | V$_{10}$ [V]: | 1.16 |
| CEDU-3-F | 15.00% | | |
| CEDU-5-F | 14.00% | | |
| ECCP-5F.F | 8.00% | | |
| CBC-33F | 3.00% | | |

Example D

| | | | |
|---|---|---|---|
| CCP-3F.F.F | 9.00% | S → N [° C.]: | <−40 |
| CCP-3OCF3 | 8.00% | Clearing point [° C.]: | +74.5 |
| CCP-5OCF3 | 4.00% | Δn [589 nm, 20° C.]: | +0.0938 |
| CCP-3OCF3.F | 12.00% | Δε [1 kHz, 20° C.]: | +14.0 |
| CGU-2-F | 9.00% | d.Δn [μm]: | 0.50 |
| CGU-3-F | 11.00% | Twist [°]: | 90 |
| CGU-5-F | 10.00% | V$_{10}$ [V]: | 1.16 |
| CEDU-3-F | 15.00% | | |
| CEDU-5-F | 15.00% | | |
| ECCP-5F.F | 4.00% | | |
| CBC-33F | 3.00% | | |

Example E

| | | | |
|---|---|---|---|
| CCH-301 | 7.00% | S → N [° C.]: | <−40 |
| CC-5-V | 4.00% | Clearing point [° C.]: | +85.0 |
| CH-33 | 4.00% | Δn [589 nm, 20° C.]: | +0.0685 |
| CCP-2F.F.F | 11.00% | d.Δn [μm]: | 0.50 |
| CCP-3F.F.F | 10.00% | Twist [°]: | 90 |
| CCZU-2-F | 6.00% | V$_{10}$ [V]: | 1.17 |
| CCZU-3-F | 18.00% | | |
| CCZU-5-F | 6.00% | | |
| CCPC-34 | 4.00% | | |
| CEDU-3-F | 15.00% | | |
| CEDU-5-F | 15.00% | | |

Example F

| | | | |
|---|---|---|---|
| CCP-2F.F.F | 8.00% | S → N [° C.]: | <−30 |
| CCP-3OCF3 | 8.00% | Clearing point [° C.]: | +70.5 |
| CCP-5OCF3 | 5.00% | Δn [589 nm, 20° C.]: | +0.0919 |
| CCP-3OCF3.F | 12.00% | Δε [1 kHz, 20° C.]: | +13.2 |
| CGU-2-F | 9.00% | d.Δn [μm]: | 0.50 |
| CGU-3-F | 11.00% | Twist [°]: | 90 |
| CGU-5-F | 10.00% | V$_{10}$ [V]: | 1.11 |
| CEDU-3-F | 15.00% | γ$_1$ [mPa.s, 20° C.]: | 223 |
| CEDU-5-F | 15.00% | | |
| ECCP-5F.F | 5.00% | | |
| CBC-33F | 2.00% | | |

Example G

| | | | |
|---|---|---|---|
| CCP-2F.F.F | 13.0% | Clearing point [° C.]: | +72.9 |
| CCP-3F.F.F | 11.0% | Δn [589 nm, 20° C.]: | +0.066 |
| CCP-5F.F.F | 6.0% | Δε [1 kHz, 20° C.]: | 8.5 |
| CCP-2OCF$_3$.F | 12.0% | | |
| CCP-3OCF$_3$.F | 8.0% | | |
| CCP-5OCF$_3$.F | 8.0% | | |
| CCOC-3-3 | 3.0% | | |
| CCOC-4-3 | 4.0% | | |
| CCOC-3-5 | 3.0% | | |
| CC-5-V | 10.0% | | |
| CEDU-2-F | 7.0% | | |
| CEDU-3-F | 7.0% | | |
| CEDU-5-F | 8.0% | | |

Example H

| | | | |
|---|---|---|---|
| CCP-2F.F.F | 13.0% | Clearing point [° C.]: | +75.5 |
| CCP-3F.F.F | 11.0% | Δn [589 nm, 20° C.]: | +0.0781 |
| CCP-5F.F.F | 6.0% | Δε [1 kHz, 20° C.]: | 9.2 |
| CCP-2OCF$_3$ | 9.0% | | |
| CCP-3OCF$_3$ | 8.0% | | |
| CCP-5OCF$_3$ | 8.0% | | |
| CGU-2-F | 9.0% | | |
| CGU-3-F | 5.0% | | |
| CCOC-3-3 | 3.0% | | |
| CCOC-4-3 | 4.0% | | |
| CCOC-3-5 | 3.0% | | |
| CC-5-V | 3.0% | | |
| CEDU-2-F | 5.0% | | |
| CEDU-3-F | 5.0% | | |
| CEDU-5-F | 8.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds having positive dielectric anisotropy, wherein said medium comprises one or more compounds of formula I

I

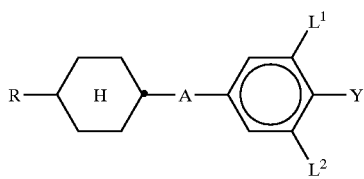

in which
R is H, an alkyl or alkenyl radical having up to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

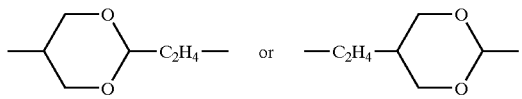

—C≡C—, —CO—, —CO—O—, —O—CO— or —O—CO—O— in such a way that O atoms are not linked directly to one another,
$L^1$ and $L^2$ are each, independently of one another, H or F,
—A— is

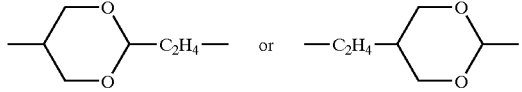

and
Y is F, Cl, halogenated alkyl, halogenated alkoxy, halogenated alkenyl, halogenated alkylalkoxy or halogenated alkenyloxy having up to 7 carbon atoms: and
said medium further comprises one or more compounds selected from formulae II, III, IV, V, VI, VII, VIII or IX:

II

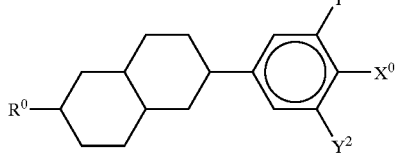

III

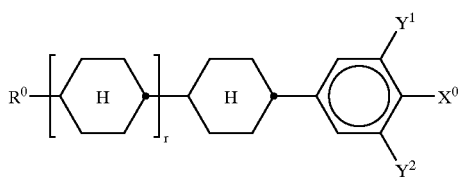

IV

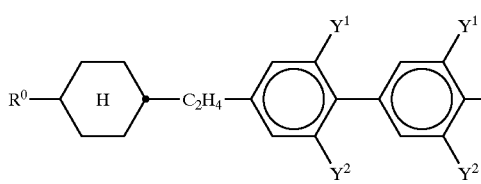

V

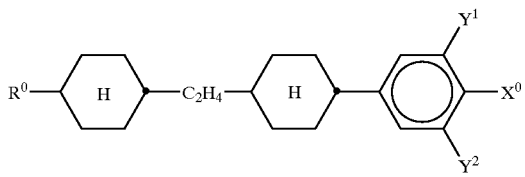

VI

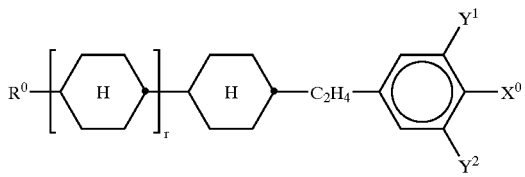

VII

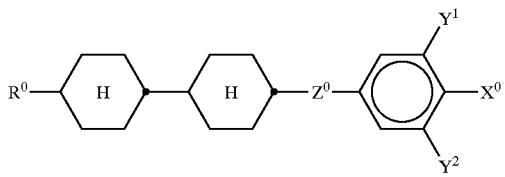

VIII

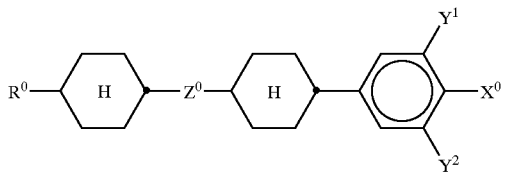

IX

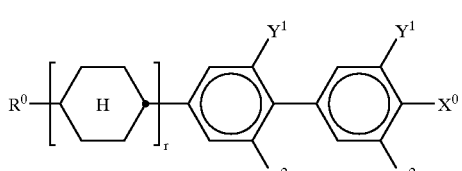

wherein
$R^0$ is n-alkyl, oxaalkyl, fluoroalkyl or alkenyl, in each case having up to 7 carbon atoms,
$X^0$ is F, Cl, or halogenated alkyl, alkenyl or alkoxy in each case having 1 to 6 carbon atoms,
$Z^0$ is —$C_4H_8$—, —$CF_2O$—, —$OCF_2$—, —CF=CF— or —$C_2F_4$—;
$Y^1$ and $Y^2$ are each F,
$Y^3$ and $Y^4$ are each, independently of one another, H or F, and
r is 0 or 1,
and comprises one or more compounds of formula IVa

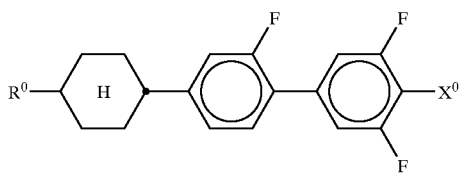

wherein
$R_0$ is n-alkyl, oxaalkyl, fluoroalkyl or alkenyl, in each case having up to 7 carbon atoms, and
$X^0$ is F, Cl, or halogenated alkyl, alkenyl or alkoxy in each case having 1 to 6 carbon atoms.

2. A medium according to claim 1, wherein the proportion of compounds of the formulae I to IX together in the total mixture is at least 50% by weight.

3. A medium according to claim 1, wherein the proportion of compounds of the formula I in the total mixture is 5–50% by weight.

4. A medium according to claim 1, wherein the proportion of compounds of the formulae II to IX in the total mixture is 20–80% by weight.

5. A medium according to claim 1, wherein said medium further comprises one or more compounds of formula E1

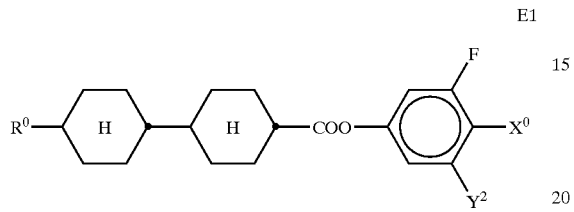

E1 wherein $R^0$ is n-alkyl, oxaalkyl, fluoroalkyl or alkenyl, in each case having up to 7 carbon atoms, $X^0$ is F, Cl, or halogenated alkyl, alkenyl or alkoxy in each case having 1 to 6 carbon atoms, and $Y^2$ H or F.

6. A medium according to claim 5, wherein $X^0$ is F or $OCF_3$ and $Y^2$ is H or F.

7. A medium according to claim 1, wherein said medium further comprises one or more compounds of formula Xa to Xf

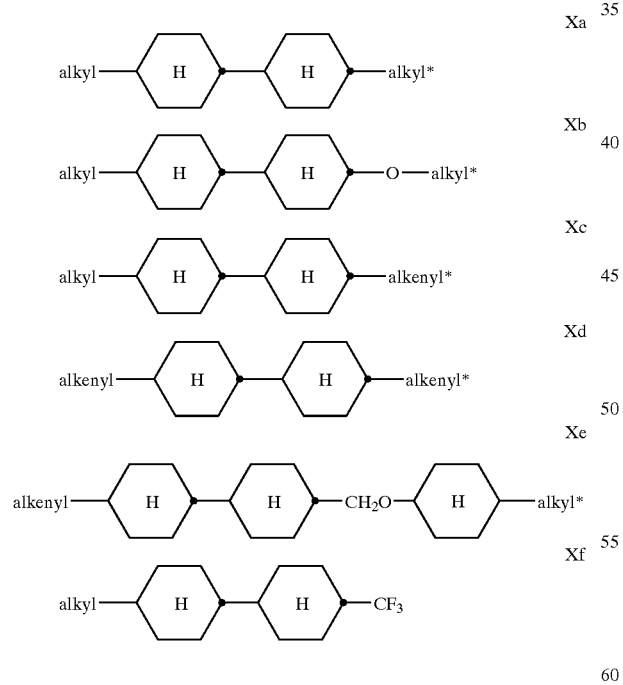

in which
  alkyl and alkyl* are each, independently of one another, a straight-chain alkyl radical having 1 to 8 carbon atoms, and
  alkenyl and alkenyl* are each, independently of one another, a 1E- or 3E-alkenyl radical having 2 to 8 carbon atoms.

8. In an electro-optical liquid-crystal display containing a liquid-crystalline medium the improvement wherein said display contains a medium according to claim 1.

9. In a method of generating an electro-optical effect using an electro-optical display, the improvement wherein said effect is generated using a display according to claim 8.

10. A liquid-crystal medium according to claim 1, wherein said medium comprises one or more compounds of formulae IIa to IIh:

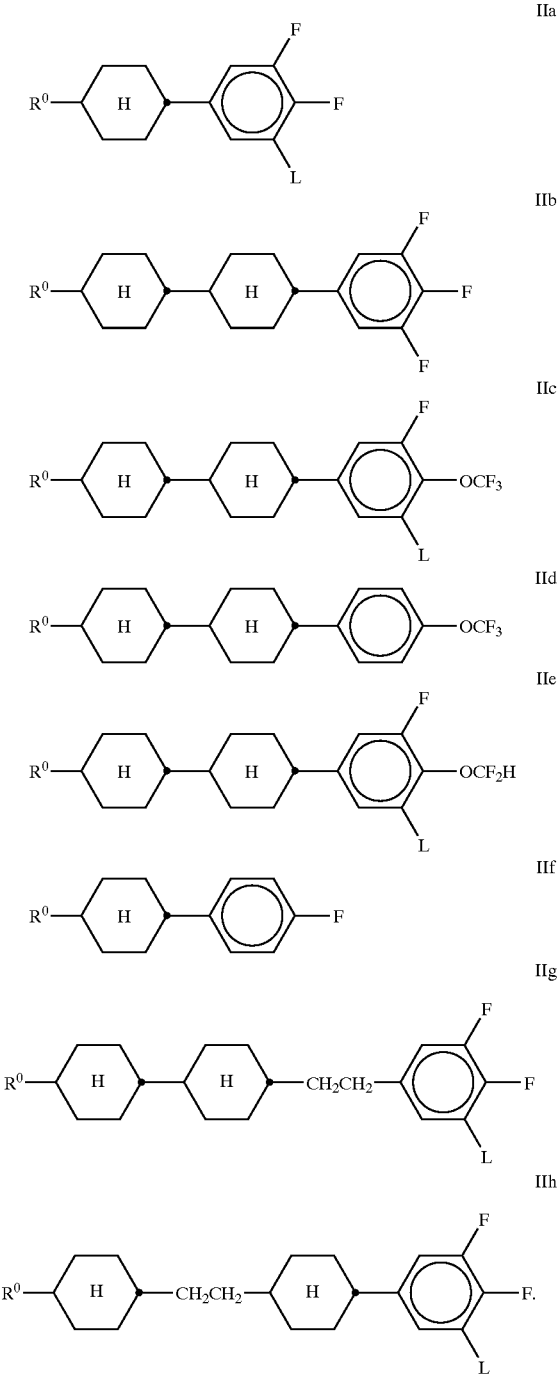

11. A liquid-crystal medium according to claim 1, wherein said medium comprises one or more compounds of formula Ivb to IVg

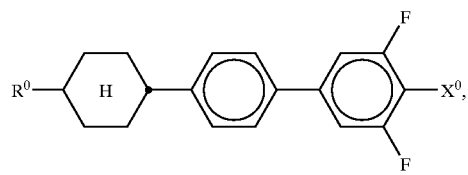
IVb

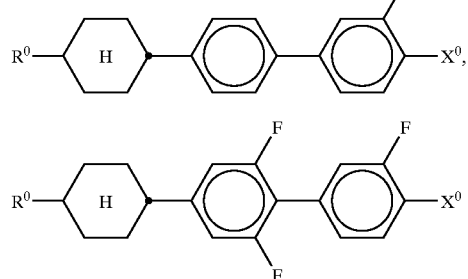
IVc

IVd

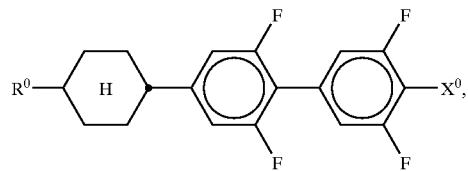
IVe

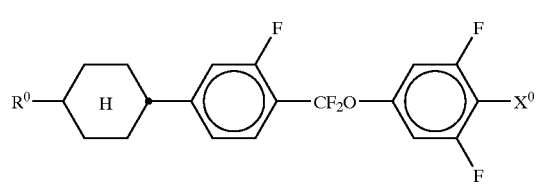
IVf or

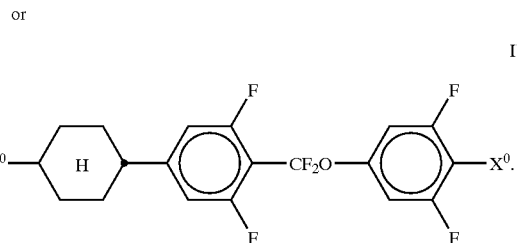
IVg

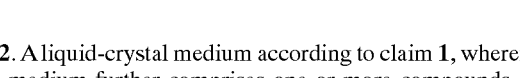

12. A liquid-crystal medium according to claim 1, wherein said medium further comprises one or more compounds of general formulae X to XVI:

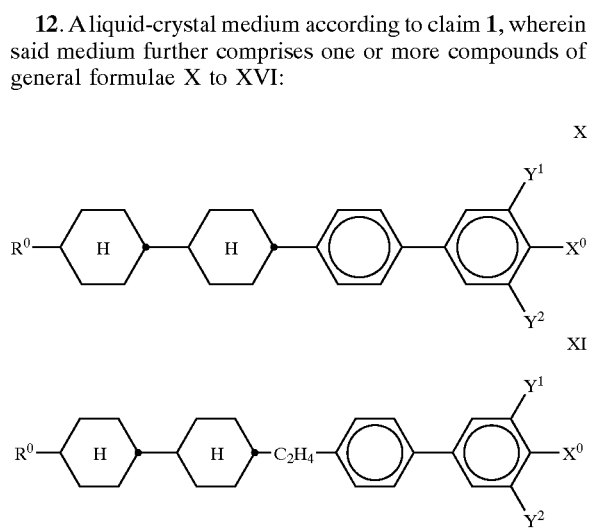
X

XI

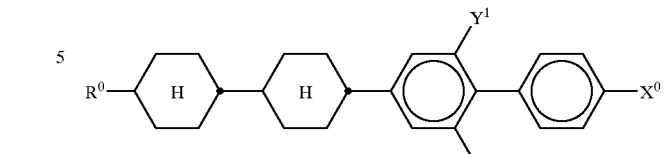
XII

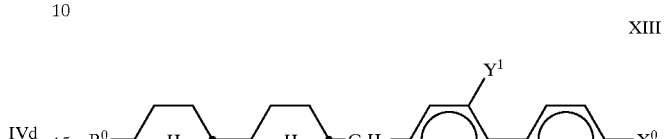
XIII

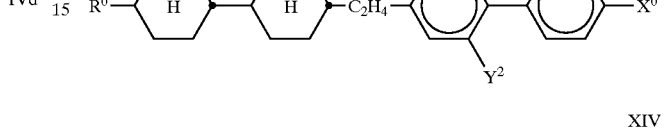
XIV

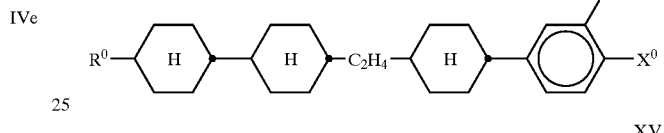
XV

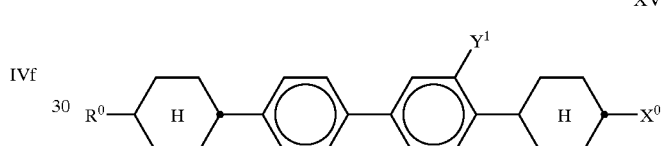
XVI

13. A liquid-crystal medium according to claim 1, wherein said medium further comprises one or more compounds of formulae D1 to D2

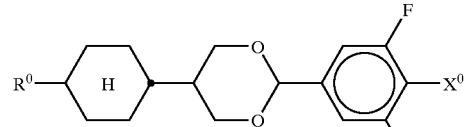
D1

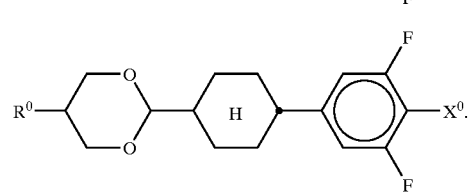
D2

14. A liquid-crystal according to claim 1, wherein said medium further comprises one or more ester compounds of formulae E1 to E5:

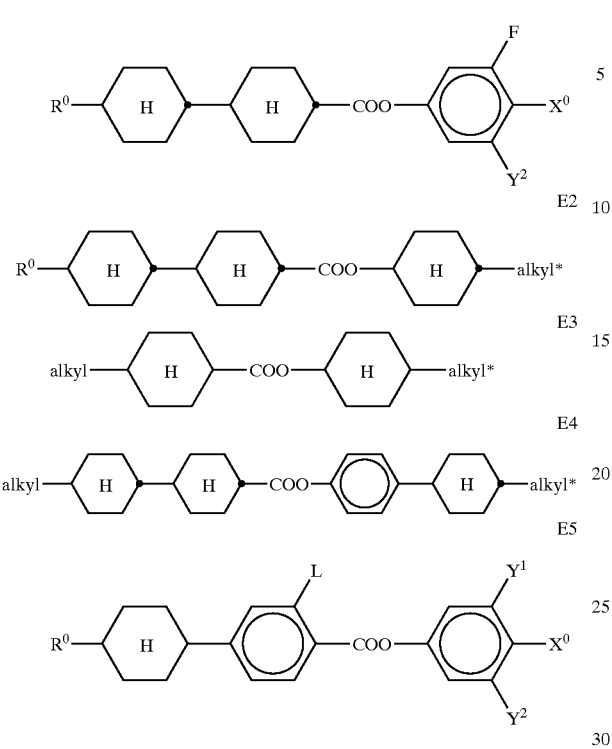

in which L is H or F, and alkyl and alkyl* are each, independently of one another, a straight-chain alkyl radical having 1–8 carbon atoms.

15. A liquid-crystal medium according to claim 1, wherein the weight ratio, compounds of formula I: (compounds of formulae II+III+IV+V+VI+VII+VIII+IX) is 1:10 to 10:1.

16. A liquid-crystal medium according to claim 5, wherein the proportion of compounds of formula E1 in the total mixture is 10–60% by weight.

17. A liquid-crystal medium according to claim 1, wherein Y is F.

18. A liquid-crystal medium according to claim 1, further comprising one or more compounds of formulae XVII to XXI:

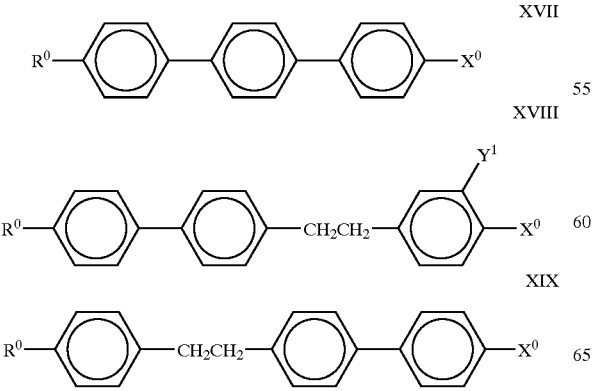

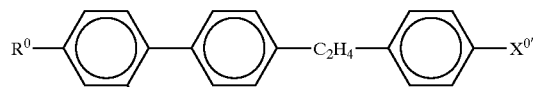

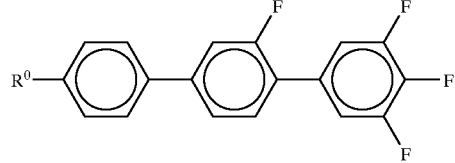

in which the 1,4-phenylene rings can be substituted by CN, chlorine or fluorine.

19. A liquid-crystalline medium comprising a mixture of polar compounds having positive dielectric anisotropy, wherein said medium comprises one or more compounds of formula I

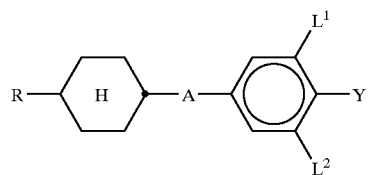

in which

R is H, an alkyl or alkenyl radical having up to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

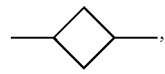

—C≡C—, —CO—, —CO—O—, —O—CO— or —O—CO—O— in such a way that O atoms are not linked directly to one another, $L^1$ and $L^2$ are each, independently of one another, H or F, —A— is

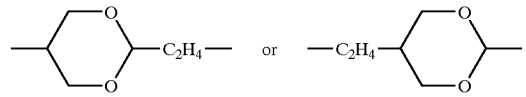

and y is F, Cl, halogenated alkyl, halogenated alkoxy, halogenated alkenyl, halogenated alkylalkoxy or halogenated alkenyloxy having up to 7 carbon atoms; and said medium further comprises one or more compounds selected from formulae II, III, IV, V, VI, VII, VIII or IX:

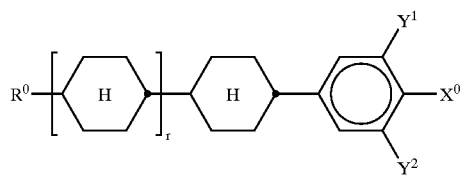
II

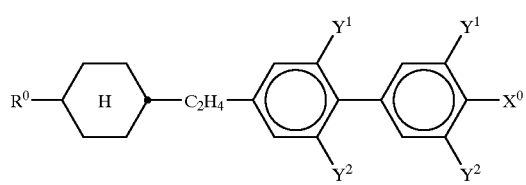
III

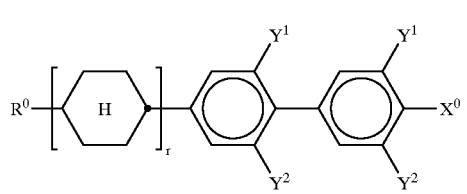
IV

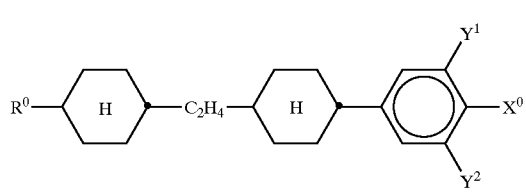
V

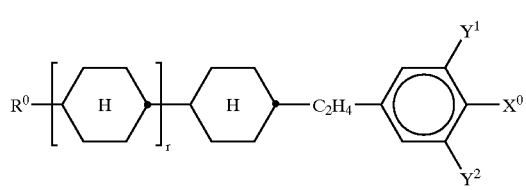
VI

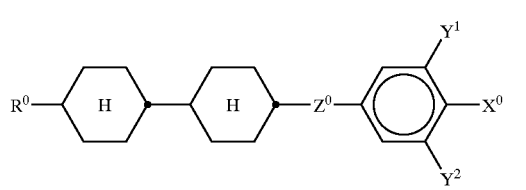
VII

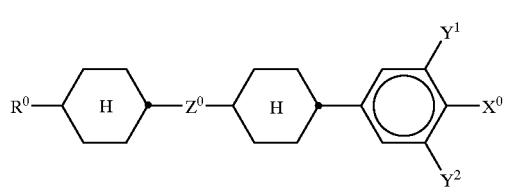
VIII

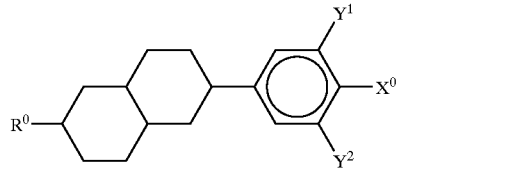
IX wherein
$R_0$ is n-alkyl, oxaalkyl fluoroalkyl or alkenyl, in each case having up to 7 carbon atoms, $X^0$ is F, Cl, or halogenated alkyl, alkenyl or alkoxy in each case having 1 to 6 carbon atoms, $Z^0$ is —$C_4H_8$—, —$CF_2O$—, —$OCF_2$—, —CF=CF— or —$C_2F_4$—, $Y^1$ and $Y^2$ are each F, $Y^3$ and $Y^4$ are each, independently of one another, H or F, and r is 0 or 1, and comprises one or more compounds of formulae XVII to XXI:

XVII

XVIII

XIX

XX ($X^{0'}$ = F or Cl)

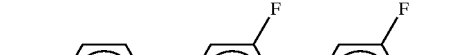
XXI in which the 1,4-phenylene rings can be substituted by CN, chlorine or fluorine.

20. A liquid-crystal medium according to claim 19, wherein Y is F.

21. A medium according to claim 19, wherein the proportion of compounds of the formulae I to IX together in the total mixture is at least 50% by weight.

22. A medium according to claim 19, wherein the proportion of compounds of the formula I in the total mixture is 5–50% by weight.

23. A medium according to claim 19, wherein the proportion of compounds of the formulae II to IX in the total mixture is 20–80% by weight.

24. A medium according to claim 19, wherein said medium further comprises one or more compounds of formula E1

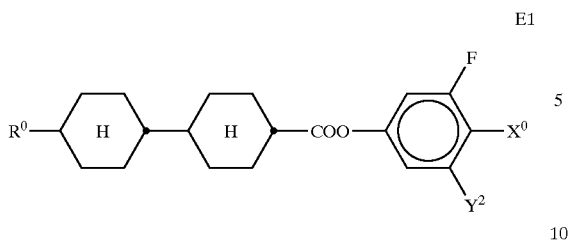

E1 wherein $R^0$ is n-alkyl, oxaalkyl, fluoroalkyl or alkenyl, in each case having up to 7 carbon atoms, $X^0$ is F, Cl, or halogenated alkyl, alkenyl or alkoxy in each case having 1 to 6 carbon atoms, and $Y^2$ H or F.

25. A medium according to claim 24, wherein $X^0$ is F or $OCF_3$ and $Y^2$ is H or F.

26. A medium according to claim 19, wherein said medium further comprises one or more compounds of formula Xa to Xf

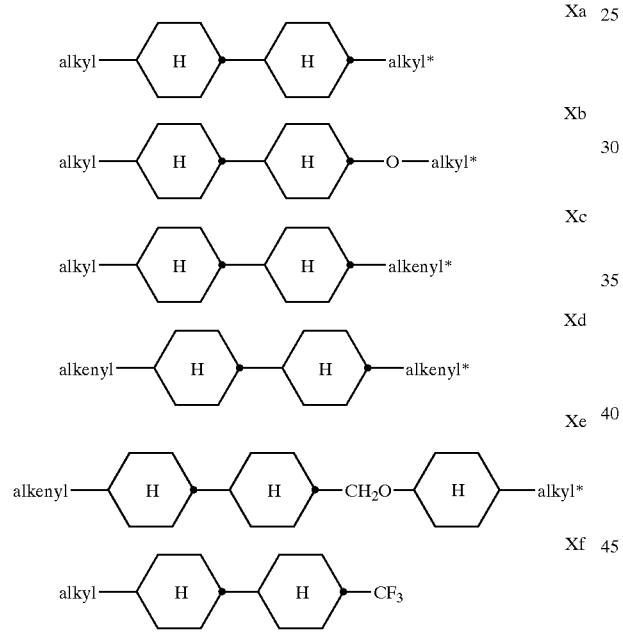

in which alkyl and alkyl* are each, independently of one another, a straight-chain alkyl radical having 1 to 8 carbon atoms, and alkenyl and alkenyl* are each, independently of one another, a 1E- or 3E-alkenyl radical having 2 to 8 carbon atoms.

27. In an electro-optical liquid-crystal display containing a liquid-crystalline medium, the improvement wherein said display contains a medium according to claim 19.

28. In a method of generating an electro-optical effect using an electro-optical display, the improvement wherein said effect is generated using a display according to claim 27.

29. A liquid-crystal medium according to claim 19, wherein said medium comprises one or more compounds of formulae IIa to IIh:

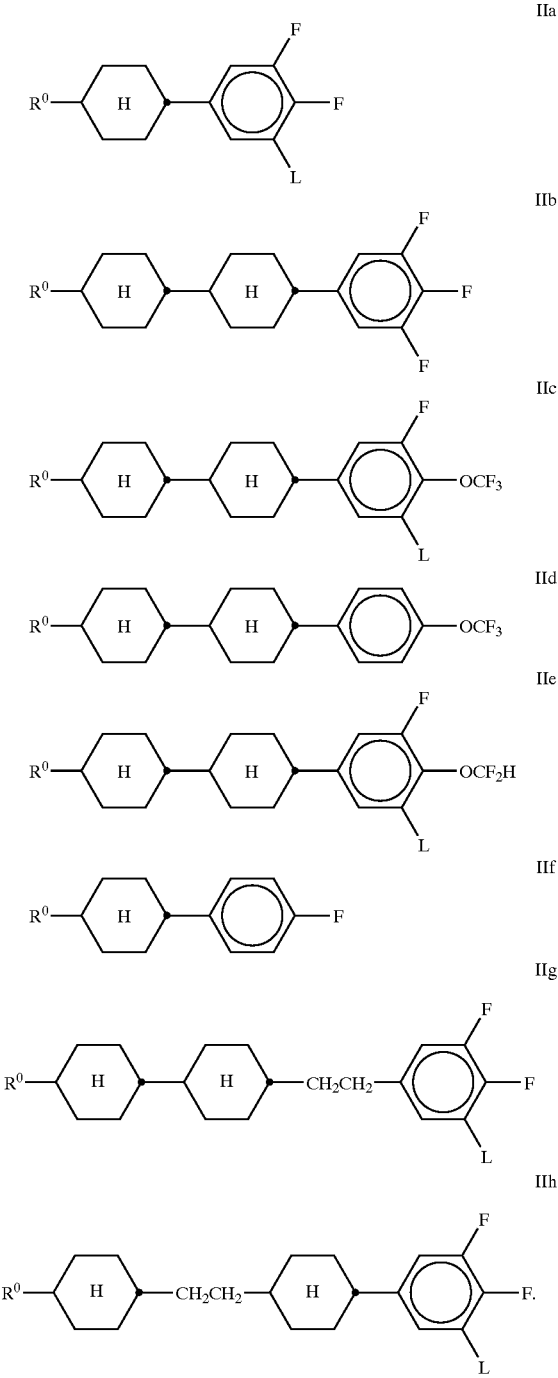

30. A liquid-crystal medium according to claim 19, wherein said medium comprises one or more compounds of formula IVa to IVg

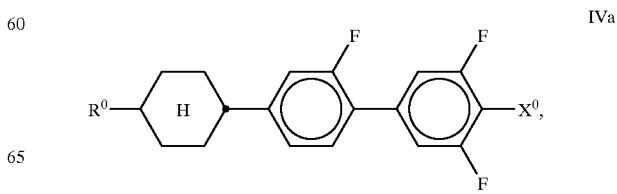

-continued

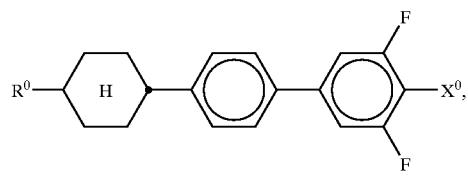
IVb

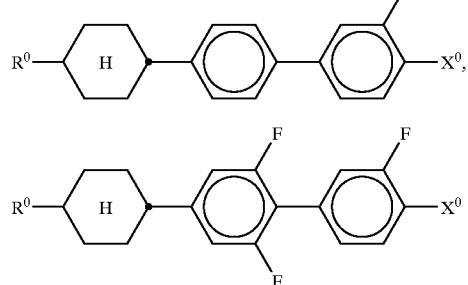
IVc

IVd

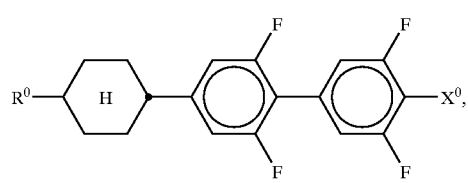
IVe

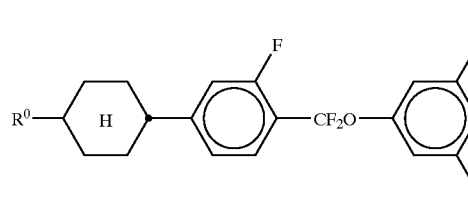
IVf

Or

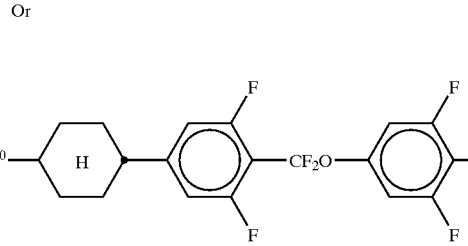
IVg

31. A liquid-crystal medium according to claim 19, wherein said medium further comprises one or more compounds of general formulae X to XVI:

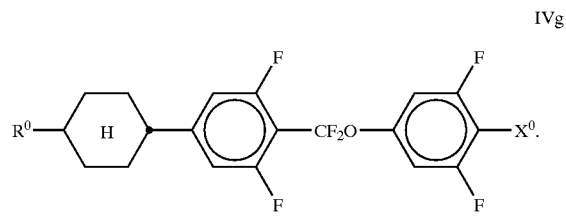
X

XI

-continued

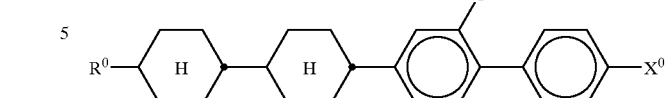
XII

XIII

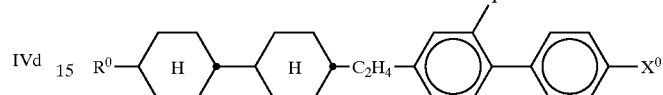
XIV

XV

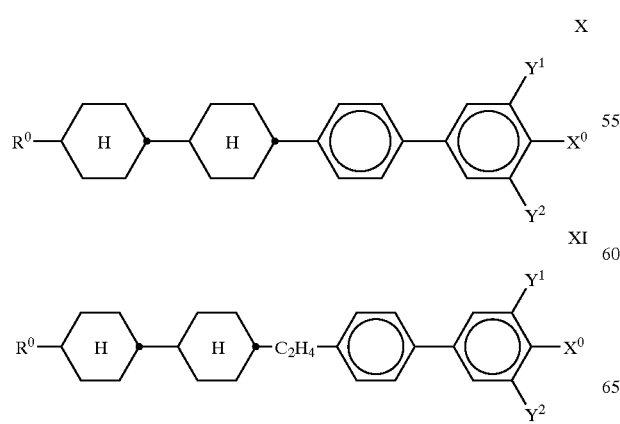
XVI

32. A liquid-crystal medium according to claim 19, wherein said medium comprises one or more compounds of formulae D1 to D2

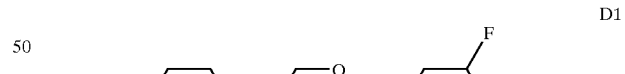
D1

D2

33. A liquid-crystal according to claim 19, wherein said medium further comprises one or more ester compounds of formulae E1 to E5:

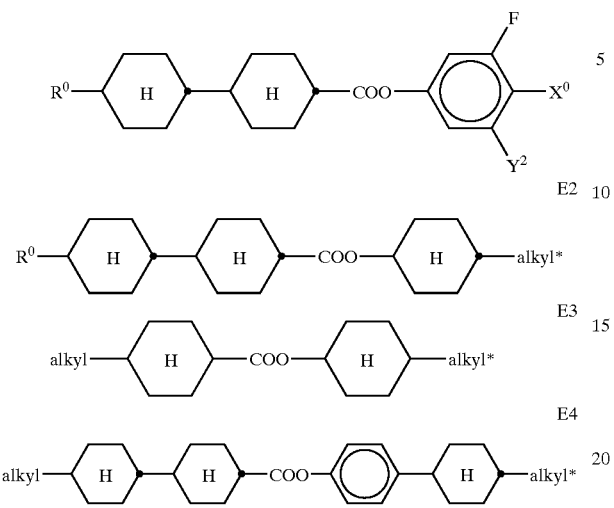

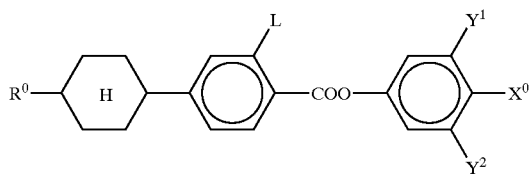

in which L is H or F, and alkyl and alkyl* are each, independently of one another, a straight-chain alkyl radical having 1–8 carbon atoms.

34. A liquid-crystal medium according to claim 19, wherein the weight ratio, compounds of formula I: (compounds of formulae II+III+IV+V+VI+VII+VIII+IX) is 1:10 to 10:1.

35. A liquid-crystal medium according to claim 24, wherein the proportion of compounds of formula E1 in the total mixture is 10–60% by weight.

* * * * *